US011856559B2

(12) United States Patent
Liu et al.

(10) Patent No.: US 11,856,559 B2
(45) Date of Patent: Dec. 26, 2023

(54) UPLINK OPERATION FOR FREQUENCY-HOPPING USER EQUIPMENT (UE) BASED ON ON/OFF PATTERNS

(71) Applicant: QUALCOMM INCORPORATED, San Diego, CA (US)

(72) Inventors: Chih-Hao Liu, San Diego, CA (US); Yisheng Xue, San Diego, CA (US); Xiaoxia Zhang, San Diego, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 17/248,248

(22) Filed: Jan. 15, 2021

(65) Prior Publication Data

US 2021/0250932 A1 Aug. 12, 2021

Related U.S. Application Data

(60) Provisional application No. 62/972,247, filed on Feb. 10, 2020.

(51) Int. Cl.
| | |
|---|---|
| *H04W 52/14* | (2009.01) |
| *H04W 72/044* | (2023.01) |
| *H04L 5/00* | (2006.01) |
| *H04W 72/1268* | (2023.01) |
| *H04W 72/23* | (2023.01) |
| *H04W 74/00* | (2009.01) |
| *H04W 72/21* | (2023.01) |

(Continued)

(52) U.S. Cl.
CPC ......... *H04W 72/044* (2013.01); *H04L 5/0055* (2013.01); *H04W 52/14* (2013.01); *H04W 72/1268* (2013.01); *H04W 72/21* (2023.01); *H04W 72/23* (2023.01); *H04W 74/004* (2013.01); *H04W 4/10* (2013.01); *H04W 76/45* (2018.02)

(58) Field of Classification Search
CPC ..... H04W 4/10; H04W 76/45; H04W 74/004; H04W 72/21; H04W 52/14
See application file for complete search history.

(56) References Cited

U.S. PATENT DOCUMENTS

| | | | | |
|---|---|---|---|---|
| 2017/0118001 A1* | 4/2017 | Yi | ......................... | H04W 56/00 |
| 2017/0150317 A1* | 5/2017 | Iun | ........................ | H04W 24/08 |

OTHER PUBLICATIONS

3GPP document, "TS 38.101-1 version 15.5.0", May 2019, pp. 1-245 (Year: 2019).*

(Continued)

*Primary Examiner* — Salvador E Rivas
(74) *Attorney, Agent, or Firm* — Haynes and Boone LLP

(57) ABSTRACT

Wireless communications systems and methods related to uplink communications with transmission on-off patterns and frequency-hopping in a shared radio frequency band are provided. A first wireless communication device communicates, with a second wireless communication device, a configuration indicating a plurality of uplink (UL) transmission on-off patterns that are offset from each other in time. The first wireless communication device communicates, with the second wireless communication device in an unlicensed band, a first UL communication signal based on a first UL transmission on-off pattern of the plurality of UL transmission on-off patterns.

30 Claims, 13 Drawing Sheets

(51) Int. Cl.
*H04W 4/10* (2009.01)
*H04W 76/45* (2018.01)

(56) References Cited

OTHER PUBLICATIONS

R1-1807855, "CDraft CR on 38.101-2: Transmit ON/OFF time mask for UL CA", May 21-25, 2018, pp. 1-4 (Year: 2018).*
R1-1808191, "Draft CR FR2 UE ON/OFF masks—further considerations", May 21-25, 2018, pp. 1-6 (Year: 2018).*

* cited by examiner

UPLINK OPERATION FOR FREQUENCY-HOPPING USER EQUIPMENT (UE) BASED ON ON/OFF PATTERNS

CROSS REFERENCE TO RELATED APPLICATIONS

The present application claims priority to and the benefit of U.S. Provisional Patent Application No. 62/972,247, filed Feb. 10, 2020, which is hereby incorporated by reference in its entirety as if fully set forth below and for all applicable purposes.

TECHNICAL FIELD

This application relates to wireless communication systems, and more particularly to uplink communications with transmission on-off patterns and frequency-hopping in a shared radio frequency band (e.g., in a shared spectrum or an unlicensed spectrum).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes communicating, by a first wireless communication device with a second wireless communication device, a configuration indicating a plurality of uplink (UL) transmission on-off patterns that are offset from each other in time; and communicating, by the first wireless communication device with the second wireless communication device in an unlicensed band, a first UL communication signal based on a first UL transmission on-off pattern of the plurality of UL transmission on-off patterns.

In an additional aspect of the disclosure, an apparatus includes a processor and a transceiver coupled to the processor. The transceiver is configured to communicate, with a second wireless communication device, a configuration indicating a plurality of uplink (UL) transmission on-off patterns that are offset from each other in time; and communicate, with the second wireless communication device in an unlicensed band, a first UL communication signal based on a first UL transmission on-off pattern of the plurality of UL transmission on-off patterns.

In an additional aspect of the disclosure, a non-transitory computer-readable medium having program code recorded thereon, the program code includes code for causing a first wireless communication device to communicate, with a second wireless communication device, a configuration indicating a plurality of uplink (UL) transmission on-off patterns that are offset from each other in time; and code for causing the first wireless communication device to communicate, with the second wireless communication device in an unlicensed band, a first UL communication signal based on a first UL transmission on-off pattern of the plurality of UL transmission on-off patterns.

In an additional aspect of the disclosure, an apparatus includes means for communicating, with a second wireless communication device, a configuration indicating a plurality of uplink (UL) transmission on-off patterns that are offset from each other in time; and means for communicating, with the second wireless communication device in an unlicensed band, a first UL communication signal based on a first UL transmission on-off pattern of the plurality of UL transmission on-off patterns.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
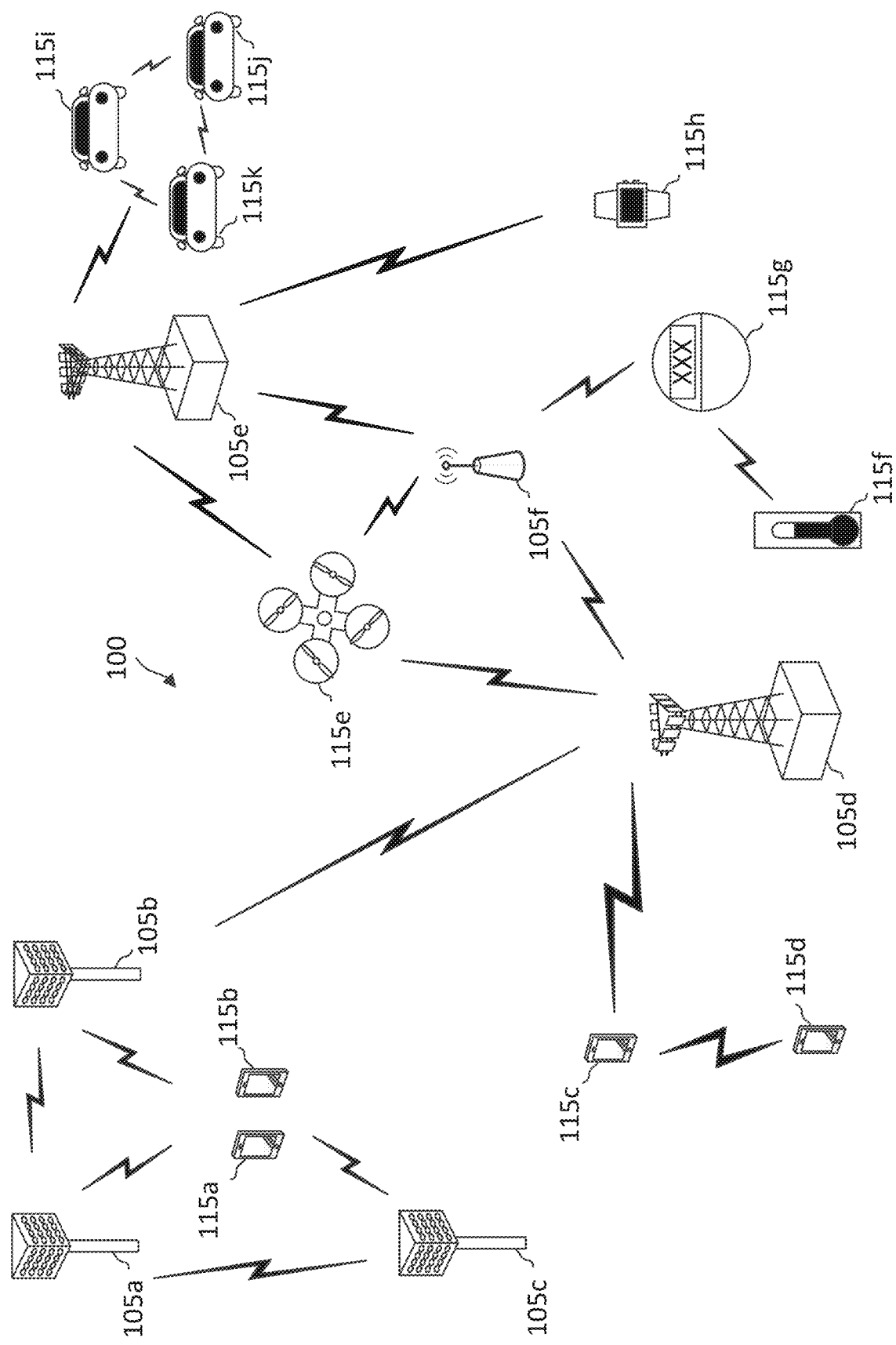
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR in an unlicensed band may be referred to as NR-U. Certain deployments may deploy a lighter version of NR-U with a lower complexity and/or reduced functionalities, for example, for narrowband operations and/or IoT applications. The lighter version of NR-U may be referred to as NR-U light. Regulations in a 2.4 GHz band allows a node to transmit without performing an LBT when the node applies frequency-hopping to transmissions and satisfies a certain transmission sequence or on-off pattern. For example, the 2.4 GHz regulation may allow a node to transmit in a 2.4 GHz band with a maximum transmission duration of about 5 milliseconds (ms) and a minimum silent or gap duration of about 5 ms between transmissions. There are two approaches to deploying NR-U light in a 2.4 GHz band. In one approach, a UE may perform an LBT before accessing the 2.4 GHz band and may apply frequency-hopping to transmissions in the 2.4 GHz band. In another approach, a UE may transmit in the 2.4 GHz band without performing an LBT, but with frequency-hopping and a transmission sequence or on/off pattern satisfying the 2.4 GHz regulation.

The present application describes mechanisms for uplink communications with transmission on-off patterns and frequency-hopping in a shared radio frequency band (e.g., in a shared spectrum or an unlicensed spectrum). The frequency-hopping and the UL transmission on-off pattern may be associated with a regulation in the shared radio frequency band (e.g., a 2.4 GHz unlicensed band). For instance, a BS may transmit a configuration to configure a UE with a plurality of UL transmission on-off patterns that are offset from each other in time. Each UL transmission on-off pattern may include alternating on-durations and off-durations. The on-durations can be used for active UL transmissions. The off-durations are transmission gaps with no UL transmission. For each UL transmission on-off pattern, the configuration may indicate an on-duration, an off-duration, a periodicity, and/or a time offset (e.g., relative to a reference time or a default UL transmission on-off pattern). The BS may configure the UE with a single active UL transmission on-off pattern at any given time. The BS may schedule the UE to transmit a first UL communication signal during an on-duration of a currently active UL transmission on-off pattern (e.g., a first UL transmission on-off pattern of the plurality of UL transmission on-off patterns).

In some aspects, the BS may instruct the UE to switch to a second UL transmission on-off pattern of the plurality of UL transmission on-off patterns. In some aspects, the BS may transmit a UL scheduling grant including the switching instruction and a schedule for a second UL communication signal. The BS may select the second UL transmission on-off pattern from the plurality of UL transmission on-off patterns based on a transmission start time (e.g., associated with a K2 parameter in NR) to be scheduled for the second UL communication signal. The BS and the UE may switch back to the first UL transmission on-off pattern after communicating the second UL communication signal. In some aspects, the BS may communicate a DL scheduling grant including the switching instruction and a schedule for a DL communication signal. The BS may select the second UL transmission on-off pattern from the plurality of UL transmission on-off patterns based on a transmission start time (e.g., associated with a K1 parameter in NR) scheduled for a hybrid automatic repeat request (HARQ) acknowledgement/negative-acknowledgement (ACK/NACK) feedback associated with the DL communication signal.

In some aspect, the BS may schedule the UE to transmit a third UL communication signal (e.g., carrying time-sensitive data) during an off-duration of a currently active UL transmission on-off pattern based on a duration of the second UL communication signal, for example, when the duration of the third UL communication signal is shorter than an on-duration of the currently active UL transmission on-off pattern. In other words, the UE may override an off-duration of a currently active UL transmission on-off pattern.

In some aspects, the BS may configure the UE with CGs and/or UL signaling transmit occasions such that the duration of the CGs and/or the UL signaling transmit occasions are within on-durations of a default UL transmission on-off pattern (e.g., the first UL transmission on-off pattern. Some examples of UL signaling may include a scheduling request (SR), a periodic-channel state information (P-CSI), a semi-persistent-channel state information (SP-CSI), a periodic-sounding reference signal (P-SRS), or a semi-persistent-sounding reference signal (SP-SRS).

In some aspects, when the UE receives a UL transmission schedule that fails to satisfy a currently active UL transmission on-off pattern (e.g., the schedule fall within an off-duration of the UL transmission on-off pattern), the UE may disregard the UL transmission schedule and skip the UL transmission. In some aspects, when the UE detects that a configured grant resource or a scheduled UL signaling transmission occasion fails to satisfy a currently active UL transmission on-off pattern (e.g., the schedule fall within an off-duration of the UL transmission on-off pattern), the UE may defer the UL transmission to a next upcoming on-duration of the currently active UL transmission on-off pattern.

Aspects of the present disclosure can provide several benefits. For example, the use of transmission on-off patterns and frequency-hopping for UL transmissions may allow a UE to transmit with no LBT (e.g., in a 2.4 GHz band based on regulations). The no-LBT UL transmissions can reduce processing complexity and/or power consumption at a UE. The use of multiple UL transmission on-off patterns that are offset from each other in time and the use of dynamic UL transmission on-off pattern switching can provide the BS with scheduling flexibility. Additionally, allowing a UE to override an off-duration of a currently active UL transmission on-off pattern, the BS and the UE may avoid the overhead and/or complexity of UL transmission on-off pattern switching. Further, aligning the configuration of CGs and/or UL signaling transmission occasions to a default UL transmission on-off pattern can avoid having the UE to skip a UL transmission when a CG resource or a UL signaling transmission occasion falls within an off-duration, and thus may allow for efficient resource usage.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point (e.g., an IEEE 802.11 AP), and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, an IEEE 802.11 terminal station (STA), or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

As discussed above, regulations in a 2.4 GHz band allows a node to transmit without performing an LBT when the node applies frequency-hopping to transmissions and satisfies a certain transmission sequence or on/off pattern with a maximum transmission duration of about 5 ms and a minimum silent or gap duration of about 5 ms between transmissions. In some aspects, when the network 100 operates over a 2.4 GHz band, a BS 105 may perform an LBT before accessing the unlicensed band and may apply frequency-hopping to DL transmissions. Since the BS 105 performs an LBT before any DL transmission, DL transmissions are not limited to the 5 ms on, 5 ms off transmission sequence. On the other hand, it may be desirable for a UE 115 to transmit UL transmissions without performing an LBT to reduce processing complexity and/or power consumption at the UE 115. When no LBT is performed, the UE 115 is limited to the 5 ms on, 5 ms off transmission sequence.

Figure 2:
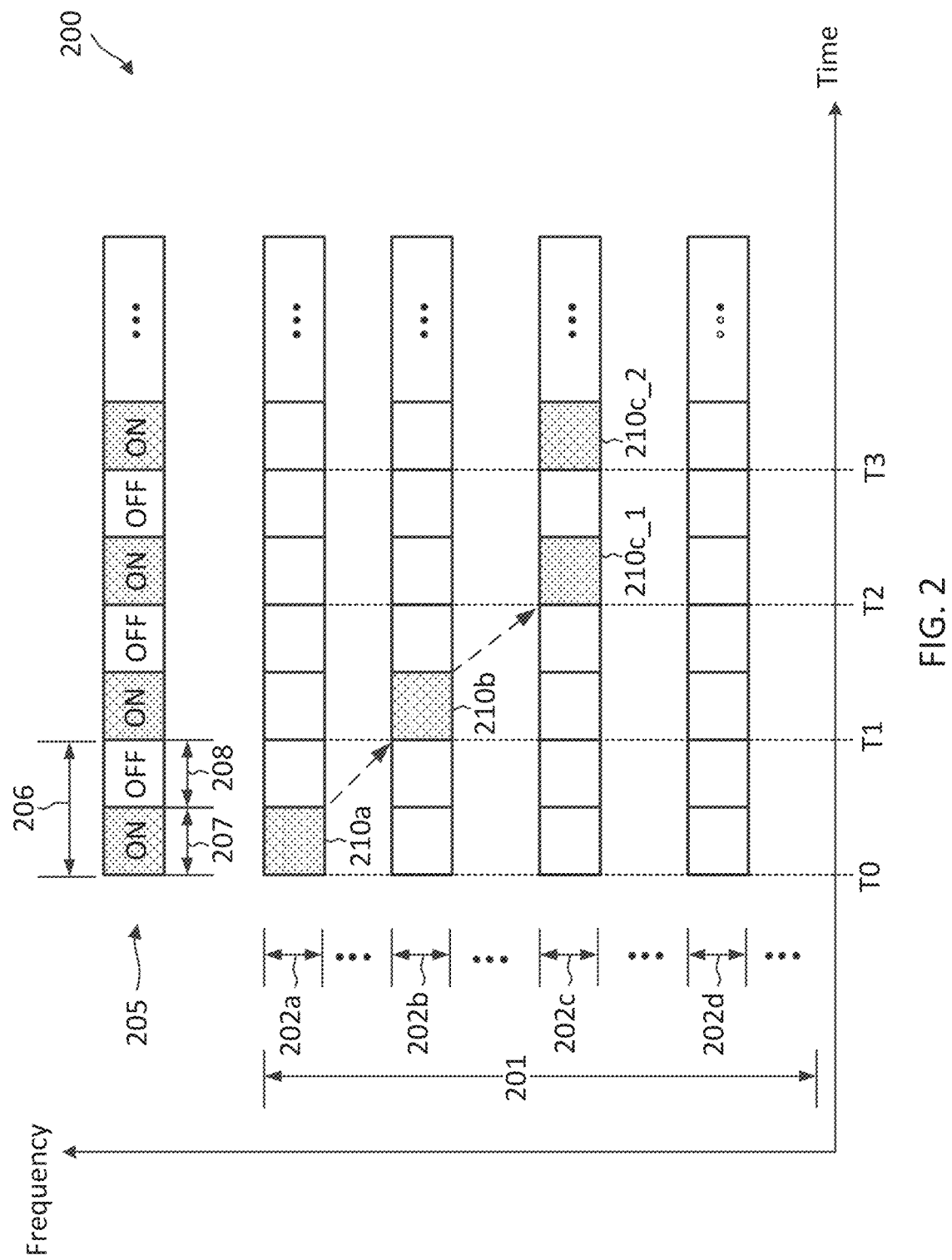
FIG. 2 illustrates an uplink (UL) transmission scheme according to some aspects of the present disclosure.

FIG. 2 illustrates an uplink (UL) transmission scheme 200 according to some aspects of the present disclosure. The scheme 200 may be employed by BSs such as the BSs 105 and UEs such as the UEs 115 in a network such as the network 100. In particular, a UE may employ the scheme 200 to transmit UL communication to a BS in a shared radio frequency band (e.g., in a shared spectrum or an unlicensed spectrum). In FIG. 2, the x-axis represents time in some arbitrary units, and the y-axis represents frequency in some arbitrary units.

In the scheme 200, a shared radio frequency band 201 is partitioned into a plurality of subchannels or frequency subbands 202 (shown as 202a, 202b, 202c, 202d . . . ). The frequency band 201 may be at any suitable frequencies (e.g., at about 2.4 GHz, 5 GHz, or 6 GHz). In some aspects, the frequency band 201 may be a 2.4 GHz unlicensed band with a BW of about 80 MHz and may be partitioned into about fifteen subbands 202 each having a BW of about 5 MHz. The frequency band 201 may be shared by multiple network operating entities of same radio access technologies (RATs) or different RATs. For instance, the frequency band 201 may be shared by NR-U, IEEE 802.11 wireless local area network (WLAN) or WiFi, and/or license assisted access (LAA).

A UE (e.g., the UEs 115) may transmit UL transmissions in the frequency band 201 based on a transmission sequence of on-off pattern 205. As shown, the transmission on-off pattern 205 includes alternating on-durations 207 and off-durations 208, where the on-off pattern has a periodicity 206. The UE may transmit during the on-durations 207, and may stay silence without any transmission during the off-duration 208. In some aspects, a BS (e.g., the BSs 105) may configure the UE with the on-durations 207, the off-durations 208, and the periodicity 206 based on a regulation of the frequency band 201. For instance, when the frequency band 201 is a 2.4 GHz unlicensed band, the BS may configure an on-duration 207 to be less than or equal to 5 ms and an off-duration to be at least 5 ms. For example, each on-duration 207 is 5 ms, each off-duration 208 is 5 ms, and the periodicity is 10 ms. In another example, each on-duration 207 is 2 ms, each off-duration 208 is 8 ms, and the periodicity is 10 ms.

Additionally, the BS may configure the UE with a frequency-hopping pattern for UL transmissions 210 (shown as 210a, 210b, 210c_1, and 210c_2). The UL transmissions 210 may include UL data (e.g., PUSCH data) and/or UL control information (e.g., scheduling request (SR), channel state information (CSI), HARQ ACK/NACK feedbacks). In the illustrated example of FIG. 2, the UE transmits a UL communication signal 201a in the frequency subband 202a during an on-duration 207 beginning at time T0. After transmitting the UL communication signal 210a, the UE remains silence (e.g. no transmission) for an off-duration 208. After the off-duration 208, at time T1, the UE hops to the frequency subband 202b and transmits a UL communication signal 201b in the frequency subband 202b during an on-duration 207. Similarly, after transmitting the UL signal 210b the UE remains silence for an off-duration 208. The transmission on-off pattern 205 may continue. At time T2, the UE hops to the frequency subband 202c, transmits a UL communication signal 201c_1 in the frequency subband 202c during an on-duration 207, and remains silence for a subsequent off-duration 208. At time T3, the UE remains in the frequency subband 202c for another on-duration 207 and transmits a UL signal 201c_2 in the frequency subband 202c. As can be seen, the UE hops across the subbands 202a, 202b, and 202c for the UL transmissions 210 (shown by the dashed arrows). Additionally, the UE can remain in a frequency hop (e.g., frequency subband 202c) for multiple on-off cycles depending on the dwell time for the frequency hopping. In some instances, the per-frequency hop dwell time may be as long as 100 ms or more. With the frequency-hopping and transmission on-off pattern 205, the UE may transmit the UL transmissions 210 without any LBT.

One challenge in maintaining the transmission on-off pattern 205 at the UE is that the BS may not have a full view of the transmissions at the UE and potentially schedule the UE during an off-duration 208 of the transmission on-off pattern 205. For instance, the UE may transmit an autonomous UL transmission (e.g., SR, CG transmission, random access preamble (MSG1)) to the BS and the BS may fail to receive it. Since the autonomous UL transmission is initiated by the UE and not scheduled by the BS, the BS may have no knowledge of the autonomous UL transmission. As such, the BS may not be in the best role in ensuring that the UE is adhered to the transmission on-off pattern 205.

Accordingly, the present disclosure provides techniques for a BS to configure a UE for UL communications by considering transmission on-off patterns and/or frequency-hopping, which may be regulated in an unlicensed band such as a 2.4 GHz band. The present disclosure also provides techniques for a UE to assist in maintaining the transmission on-off patterns. With the frequency-hopping and transmission on-off patterns, the UE may transmit UL transmissions with no LBT.

Figure 3:
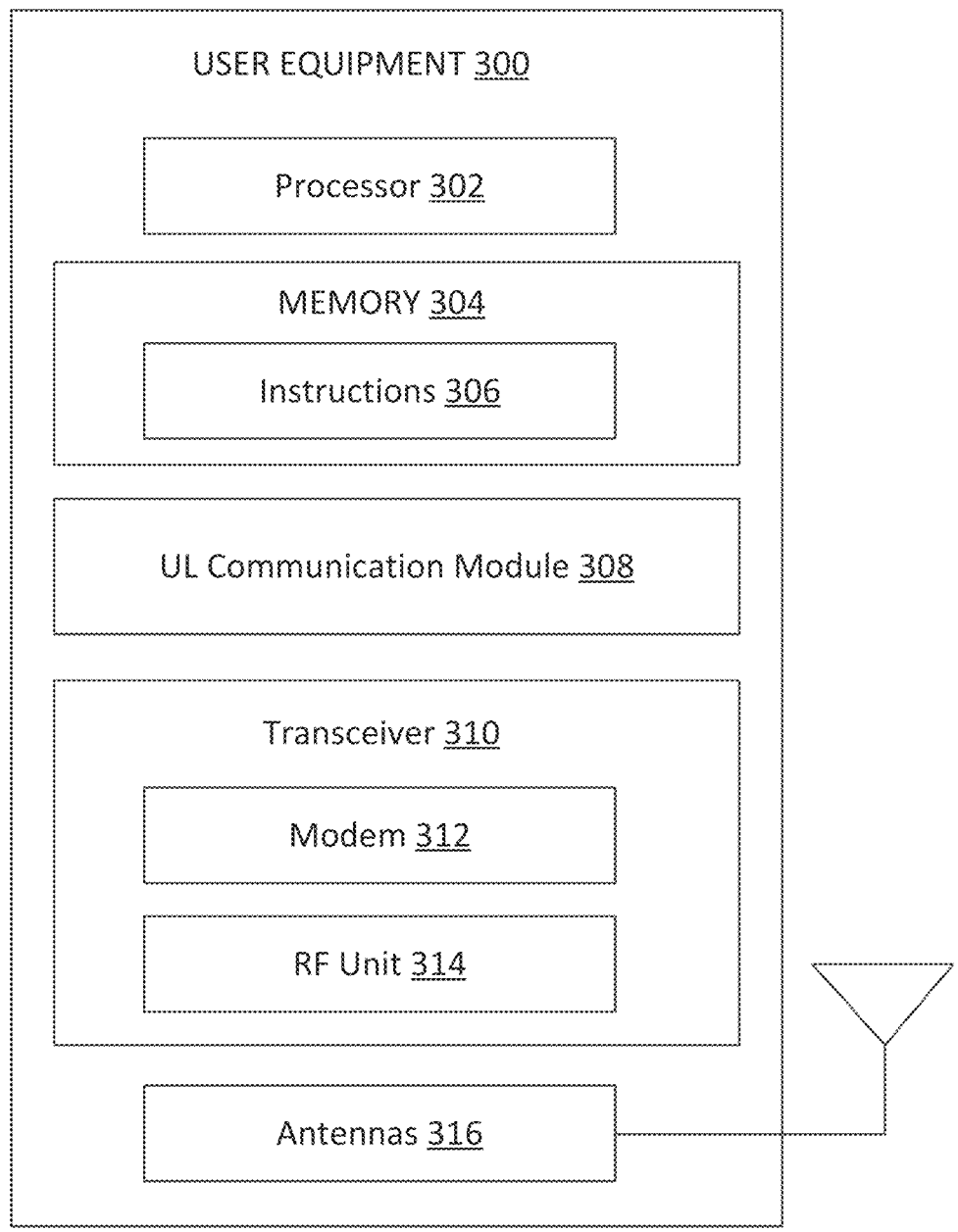
FIG. 3 is a block diagram of a user equipment (UE) according to some aspects of the present disclosure.

FIG. 3 is a block diagram of an exemplary UE 300 according to some aspects of the present disclosure. The UE 300 may be a UE 115 discussed above in FIG. 1. As shown, the UE 300 may include a processor 302, a memory 304, a UL communication module 308, a transceiver 310 including a modem subsystem 312 and a radio frequency (RF) unit 314, and one or more antennas 316. These elements may be coupled with one another. The term "coupled" may refer to directly or indirectly coupled or connected to one or more intervening elements. For instance, these elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 1-2 and 5-13. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The UL communication module 308 may be implemented via hardware, software, or combinations thereof. For example, the UL communication module 308 may be implemented as a processor, circuit, and/or instructions 306 stored in the memory 304 and executed by the processor 302. In some instances, the UL communication module 308 can be integrated within the modem subsystem 312. For example, the UL communication module 308 can be implemented by a combination of software components (e.g., executed by a DSP or a general processor) and hardware components (e.g., logic gates and circuitry) within the modem subsystem 312.

The UL communication module 308 may be used for various aspects of the present disclosure, for example, aspects of FIGS. 1-2 and 5-13. For instance, the UL communication module 308 is configured to receive, from a BS (e.g., the BSs 105), a configuration indicating a plurality of UL transmission on-off patterns that are offset from each other in time, receive an indication of an active UL transmission on-off pattern (e.g., the first UL transmission on-off pattern), receive a grant for a UL schedule that is within an on-duration of the currently active UL transmission on-off pattern, and transmit a UL communication signal based on the UL schedule.

In some aspects, the UL communication module 308 is further configured to receive, for example, from the BS, an instruction to switch to a second UL transmission on-off pattern of the plurality of UL transmission on-off patterns. In some aspects, the UL communication module 308 may receive a UL scheduling grant including the switching instruction and a schedule for a second UL communication signal. The second UL transmission on-off pattern may be selected by the BS from the plurality of UL transmission on-off patterns based on a transmission start time (e.g., associated with a K2 parameter in NR) to be scheduled for the second UL communication signal. The UL communication module 308 may switch back to the first UL transmission on-off pattern after transmitting the second UL communication signal. In some aspects, the UL communication module 308 may receive a DL scheduling grant including the switching instruction and a schedule for a DL communication signal. The second UL transmission on-off pattern may be selected by the BS from the plurality of UL transmission on-off patterns based on a transmission start time (e.g., associated with a K1 parameter in NR) scheduled for a HARQ ACK/NACK feedback associated with the DL communication signal.

In some aspect, the UL communication module 308 is further configured to receive, from the BS, a UL schedule to transmit a third UL communication signal (e.g., carrying time-sensitive data) during an off-duration of a currently active UL transmission on-off pattern based on a duration of the second UL communication signal, for example, when the duration of the third UL communication signal is shorter than an on-duration of the currently active UL transmission on-off pattern.

In some aspects, the UL communication module 308 is further configured to receive, from the BS, CGs and/or UL signaling transmit occasions. The durations of the CGs and/or the UL signaling transmit occasions may be within on-durations of a default UL transmission on-off pattern (e.g., the first UL transmission on-off pattern.

In some aspects, the UL communication module 308 is configured to determine whether a UL transmission schedule received from the BS satisfies a currently active UL transmission on-off pattern. In some instances, if the UL transmission schedule fails to satisfy a currently active UL transmission on-off pattern, the UL communication module 308 may disregard the UL transmission schedule and skip the UL transmission. In some other instances, if the UL transmission schedule fails to satisfy a currently active UL transmission on-off pattern, the UL communication module 308 may defer the UL transmission to a next upcoming on-duration of the currently active UL transmission on-off pattern. Mechanisms for UL operations with UL transmission on-off pattern and frequency-hopping are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 and/or the UL communication module 308 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 314 may be configured to process (e.g., perform analog to digital conversion or digital to analog conversion, etc.) modulated/encoded data (e.g., PUSCH, PUCCH, HARQ ACK/NACK, CG transmissions, SRs, CSI, and/or SRSs) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., RRC configuration, PDSCH, PDCCH, UL transmission on-off pattern configurations) to the UL communication module 308 for processing. The antennas 316 may include multiple antennas of similar or different designs in order to sustain multiple transmission links. The RF unit 314 may configure the antennas 316.

In some aspects, the transceiver 310 is coupled to the processor 302 and configured to coordinate with the UL communication module 308 to receive, from a BS, a configuration indicating a plurality of UL transmission on-off patterns that are offset from each other in time and transmit, to the BS, a first UL communication signal based on a first UL transmission on-off pattern of the plurality of UL transmission on-off patterns.

In an aspect, the UE 300 can include multiple transceivers 310 implementing different RATs (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

Figure 4:
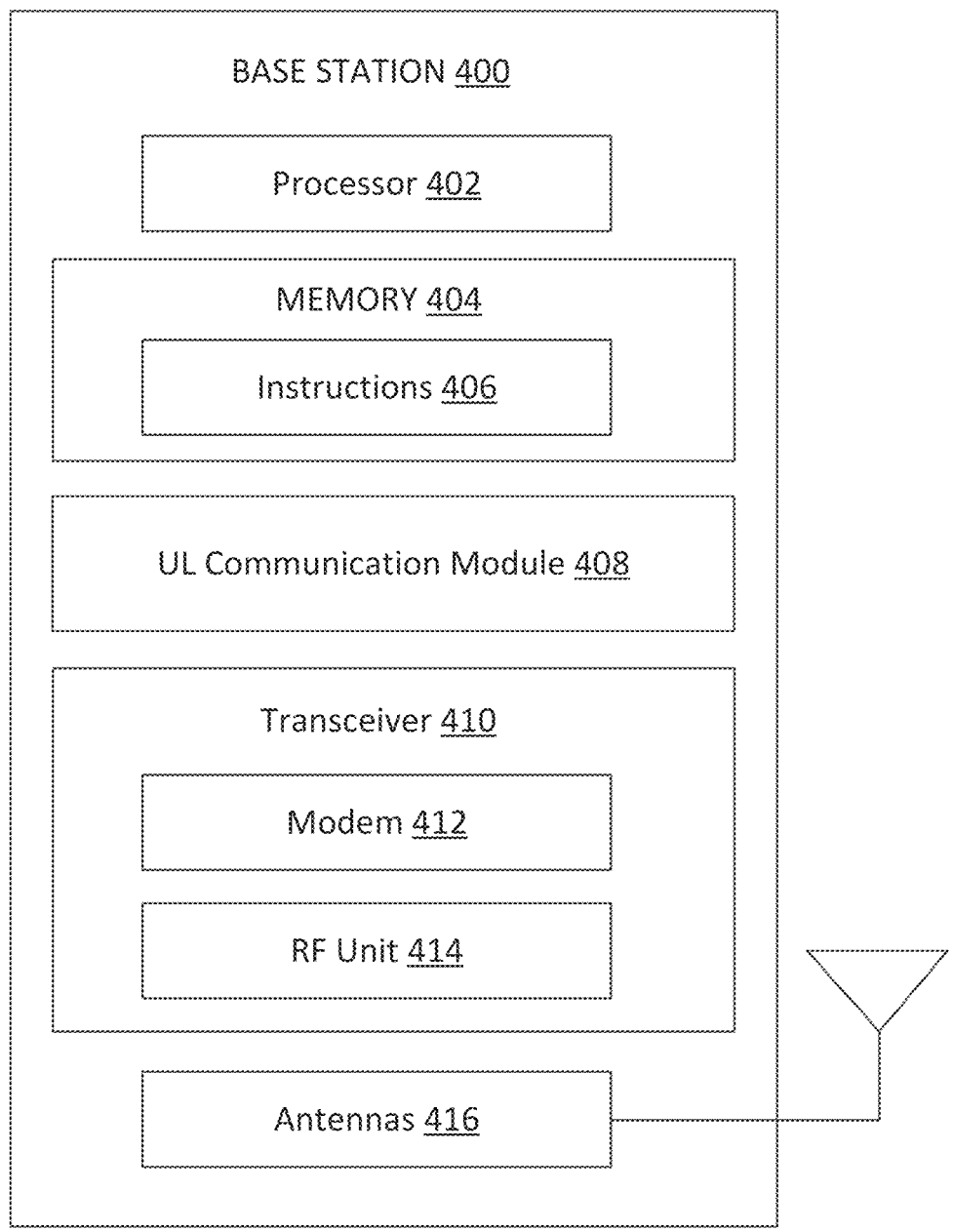
FIG. 4 is a block diagram of an exemplary base station (BS) according to some aspects of the present disclosure.

FIG. 4 is a block diagram of an exemplary BS 400 according to some aspects of the present disclosure. The BS 400 may be a BS 105 in the network 100 as discussed above in FIG. 1. As shown, the BS 400 may include a processor 402, a memory 404, a UL communication module 408, a transceiver 410 including a modem subsystem 412 and a RF unit 414, and one or more antennas 416. These elements may be coupled with one another. The term "coupled" may refer to directly or indirectly coupled or connected to one or more intervening elements. For instance, these elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 1-2 and 5-13. Instructions 406 may also be referred to as code, which may be interpreted broadly to include any type of computer-readable statement(s) as discussed above with respect to FIG. 3.

The UL communication module 408 may be implemented via hardware, software, or combinations thereof. For example, the UL communication module 408 may be implemented as a processor, circuit, and/or instructions 406 stored in the memory 404 and executed by the processor 402. In some instances, the UL communication module 408 can be integrated within the modem subsystem 412. For example, the UL communication module 408 can be implemented by a combination of software components (e.g., executed by a DSP or a general processor) and hardware components (e.g., logic gates and circuitry) within the modem subsystem 412.

The UL communication module 408 may be used for various aspects of the present disclosure, for example, aspects of FIGS. 1-2 and 5-13. For instance, the UL communication module 408 is configured to transmit, to a UE (e.g., the UEs 115), a configuration indicating a plurality of UL transmission on-off patterns that are offset from each other in time, receive an indication of an active UL transmission on-off pattern (e.g., the first UL transmission on-off pattern), transmit a grant for a UL schedule that is within an on-duration of the currently active UL transmission on-off pattern, and receive a UL communication signal from the UE based on the UL schedule.

In some aspects, the UL communication module 408 is further configured to transmit, for example, to the UE, an instruction to switch to a second UL transmission on-off pattern of the plurality of UL transmission on-off patterns. In some aspects, the UL communication module 408 may transmit a UL scheduling grant including the switching instruction and a schedule for a second UL communication signal. The UL communication module 408 is further configured to select the second UL transmission on-off pattern from the plurality of UL transmission on-off patterns based on a transmission start time (e.g., associated with a K2 parameter in NR) to be scheduled for the second UL communication signal. The UL communication module 408 may switch back to the first UL transmission on-off pattern after transmitting the second UL communication signal. In some aspects, the UL communication module 408 may transmit a DL scheduling grant including the switching instruction and a schedule for a DL communication signal. The UL communication module 408 is further configured to select the second UL transmission on-off pattern from the plurality of UL transmission on-off patterns based on a transmission start time (e.g., associated with a K1 parameter in NR) scheduled for a HARQ ACK/NACK feedback associated with the DL communication signal.

In some aspect, the UL communication module 408 is further configured to transmit, to the UE, a UL schedule to transmit a third UL communication signal (e.g., carrying time-sensitive data) during an off-duration of a currently active UL transmission on-off pattern based on a duration of the second UL communication signal, for example, when the duration of the third UL communication signal is shorter than an on-duration of the currently active UL transmission on-off pattern.

In some aspects, the UL communication module 408 is further configured to transmit, to the UE, CGs and/or UL signaling transmit occasions. The durations of the CGs and/or the UL signaling transmit occasions may be within on-durations of a default UL transmission on-off pattern (e.g., the first UL transmission on-off pattern. Mechanisms for UL operations with UL transmission on-off pattern and frequency-hopping are described in greater detail herein.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a polar coding scheme, a digital beamforming scheme, etc. The RF unit 414 may be configured to process (e.g., perform analog to digital conversion or digital to analog conversion, etc.) modulated/encoded data (e.g., RRC configuration, PDSCH, PDCCH, UL transmission on-off pattern configurations) from the modem subsystem 412 (on outbound transmissions) or of transmissions originating from another source such as a UE 115 and/or UE 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices and provide the received data messages for processing and/or demodulation at the transceiver 410. The transceiver 410 may provide the demodulated and decoded data (e.g., PUSCH, PUCCH, HARQ ACK/NACK, CG transmissions, SRs, CSI, and/or SRSs) to the UL communication module 408 for processing. The antennas 416 may include multiple antennas of similar or different designs in order to sustain multiple transmission links.

In some aspects, the transceiver 410 is coupled to the processor 402 and configured to coordinate with the UL communication module 408 to transmit, to a UE, a configuration indicating a plurality of UL transmission on-off patterns that are offset from each other in time and receive, from the UE, a first UL communication signal based on a first UL transmission on-off pattern of the plurality of UL transmission on-off patterns.

In an aspect, the BS 400 can include multiple transceivers 410 implementing different RATs (e.g., NR and LTE). In an aspect, the BS 400 can include a single transceiver 410 implementing multiple RATs (e.g., NR and LTE). In an aspect, the transceiver 410 can include various components, where different combinations of components can implement different RATs.

Figure 5:
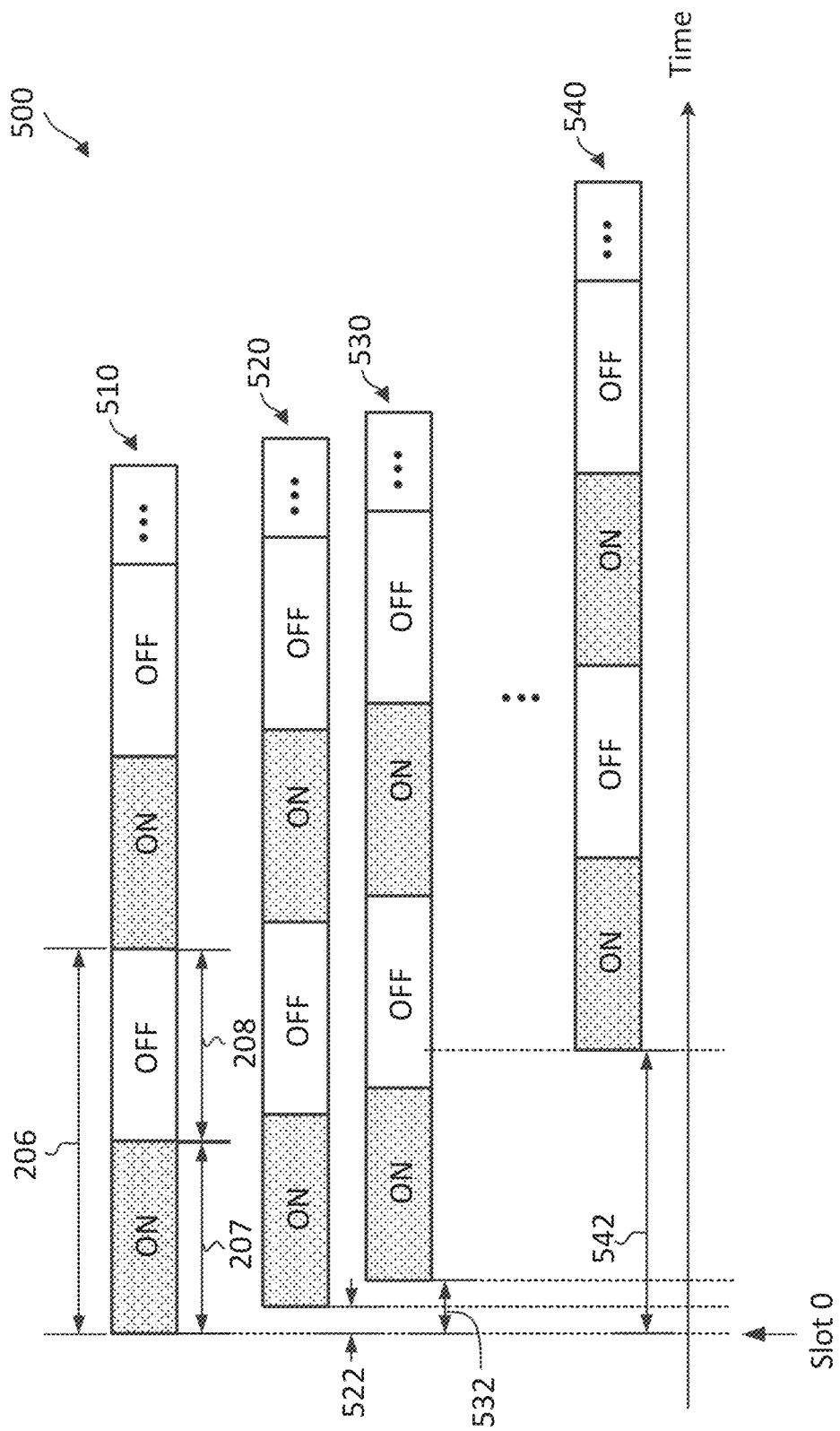
FIG. 5 illustrates a UL transmission on-off pattern configuration scheme according to some aspects of the present disclosure.

FIG. 5 illustrates a UL transmission on-off pattern configuration scheme 500 according to some aspects of the present disclosure. The scheme 500 may be employed by BSs such as the BSs 105 and 400 and UEs such as the UEs 115 and 300 in a network such as the network 100. In particular, a BS may configure a UE with various UL transmission on-off patterns as shown in the scheme 500. In FIG. 5, the x-axis represents time in some arbitrary units. The scheme 500 is described using a similar transmission on-off pattern structure as in the scheme 200 and may use the same reference numerals for simplicity's sake.

To provide scheduling flexibility, a BS (e.g., the BSs 105 and/or 400) may configure a UE (e.g., the UEs 115 and/or 300) with multiple transmission on-off patterns that are offset from each other in time. At any given time, one transmission on-off pattern may be active. The BS may schedule the UE to transmit during an on-duration of a currently active UL transmission on-off pattern. The BS may configure the UE with a default transmission on-off pattern and may instruct the UE to switch to a different transmission on-off pattern, for example, to meet a certain scheduling timeline. In other words, the BS may transmit a configuration indicating the multiple transmission on-off patterns to the UE and may indicate which of the transmission on-off patterns is a default transmission on-off pattern for the UE, and may subsequently transmit an instruction to switch the UE to utilize a different one of the multiple transmission on-off patterns.

In the illustrated example of FIG. 5, the BS may configure the UE with transmission on-off patterns 510, 520, 530, and 540. Each of the transmission on-off patterns 510, 520, 530, and 540 may have alternating on-durations 207 and off-durations 208 with a periodicity 206 similar to the transmission on-off pattern 205. Additionally, the transmission on-off patterns 510, 520, 530, and 540 may be offset from a reference time (e.g., shown as slot 0) and offset from each other. As shown, the transmission on-off pattern 510 is aligned to slot 0, the transmission on-off pattern 520 is offset from slot 0 and the transmission on-off pattern 510 by a time offset 522, the transmission on-off pattern 530 is offset from slot 0 and the transmission on-off pattern 510 by a time offset 532, and the transmission on-off pattern 540 is offset from slot 0 and the transmission on-off pattern 510 by a time offset 542. Each of the time offsets 522, 532, and 542 are different. The time offsets 522, 532, and 542 may have any duration. In certain aspects, when the on-duration 207 is 5 ms long and the off-duration 208 is 5 ms long, the BS may configure the UE with about 10 UL transmission on-off patterns with incrementing time offsets at an increment of about 1 ms. As an example, the time offset 522 for the transmission on-off pattern 520 can be about 1 ms long, the time offset 532 for the transmission on-off pattern 530 can be about 2 ms long, and the time offset 542 for the transmission on-off pattern 540 may be about 9 ms long. The different time offsets may provide the BS with scheduling flexibility as will be discussed further below in FIG. 9.

In some aspects, the BS may configure the UE with multiple UL transmission on-off patterns (e.g., the transmission on-off pattern 510, 520, 530, 540) via an RRC configuration. For instance, the RRC configuration may indicate a number of UL transmission on-off patterns. For each UL transmission on-off pattern, the RRC configuration may indicate an on-duration (e.g., the on-durations 207), an off-duration (e.g., the off-durations 208), a periodicity (e.g., the periodicity 206), and/or a time offset (e.g., the time offsets 522, 532, and 542). While FIG. 5 illustrates the UL transmission on-off patterns 510, 520, 530, 540 each having the same on-durations 207, the same off-durations 208, and the same periodicity 206, the BS may configure the UL transmission on-off patterns with any on-durations, off-durations, and/or periodicities provided that the transmission on-off patterns satisfy a certain regulation (e.g., a regulation on transmission duty cycle). For instance, all UL transmission on-off patterns 510, 520, 530, and 540 may have a periodicity of 10 ms, but some of the UL transmission on-off patterns 510, 520, 530, and 540 may have an on-duration 207 of about 1 ms, about 2 ms, about 3 ms, or about 4 ms.

In some aspects, the BS may implement the scheme 500 in conjunction with the scheme 200 described above with reference to FIG. 2. For instance, the BS may configure one of the UL transmission on-off patterns (e.g., the UL transmission on-off pattern 510) as an active UL transmission on-off pattern for the UE. The BS may schedule the UE with UL transmissions during on-durations 207 of the UL transmission on-off pattern 510 and may configure the UE to apply frequency-hopping to the UL transmission as shown in FIG. 2.

Figure 6:
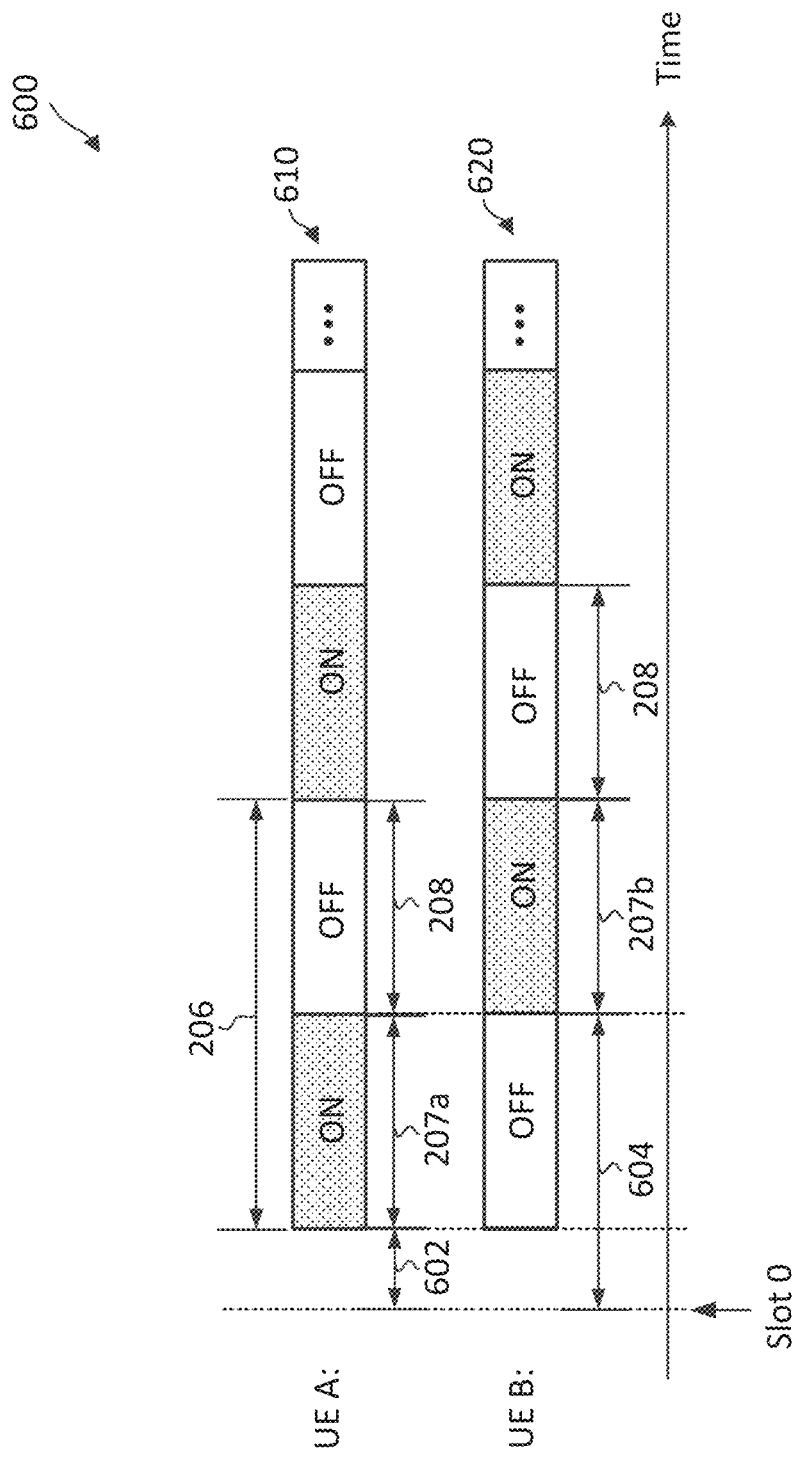
FIG. 6 illustrates a UL transmission on-off pattern configuration scheme according to some aspects of the present disclosure.

FIG. 6 illustrates a UL transmission on-off pattern configuration scheme 600 according to some aspects of the present disclosure. The scheme 600 may be employed by BSs such as the BSs 105 and 400 and UEs such as the UEs 115 and 300 in a network such as the network 100. In particular, a BS may configure a UE with various UL transmission on-off patterns as shown in the scheme 600. In FIG. 6, the x-axis represents time in some arbitrary units. The scheme 600 is described using a similar transmission on-off pattern structure as in the scheme 200 and may use the same reference numerals for simplicity's sake.

In the scheme 600, a BS (e.g., the BSs 105 and/or 400) may configure two UEs (e.g., the UEs 115 and/or 300) with non-overlapping UL transmission on-off patterns. In other words, the off-durations (e.g., the off-durations 208) of one UL transmission on-off pattern may aligned to on-durations (e.g., the on-durations 207) of another UL transmission on-off pattern. The non-overlapping UL transmission on-off patterns allow the BS to schedule the two UEs for UL transmissions using time-division-multiplexing (TDM) as will be discussed further below in FIG. 7.

In the illustrated example of FIG. 6, the BS may configure a UE A (e.g., the UEs 115 and/or 300) with a UL transmission on-off pattern 610 and may configure another UE B (e.g., the UEs 115 and/or 300) with a UL transmission on-off pattern 620. The on-duration 207a of the UL transmission on-off pattern 610 may be offset from a reference time (e.g., shown as slot 0) by a time offset 602. The on-duration 207b of the UL transmission on-off pattern 620 may be offset from the reference time by a time offset 604. The UL transmission on-off pattern 620 and the UL transmission on-off pattern 610 have non-overlapping on-durations 207 and non-overlapping off-durations 208. In an example, the on-durations 207 may be about 5 ms and the time offsets 602 and 604 may differ by 5 ms to create the non-overlapping patterns 610 and 620.

In some aspects, the BS may implement the scheme 600 in conjunction with the scheme 200 described above with reference to FIG. 2. For instance, the BS may schedule the UE A to transmit during on-durations 207 of the UL transmission on-off pattern 610 with frequency-hopping as shown in the scheme 200 and may schedule the UE B to transmit during on-durations 207 of the UL transmission on-off pattern 620 with frequency-hopping as shown in the scheme 200. In some instances, the BS may configure the UE A and the UE B with the same frequency-hopping pattern and time-multiplex UE A's UL transmissions and UE B's UL transmissions. In some other instances, the BS may configure the UE A and the UE B with different frequency-hopping patterns and may utilize TDM when the UE A and the UE B occupy a same frequency subband (e.g., the frequency subband 202).

Figure 7:
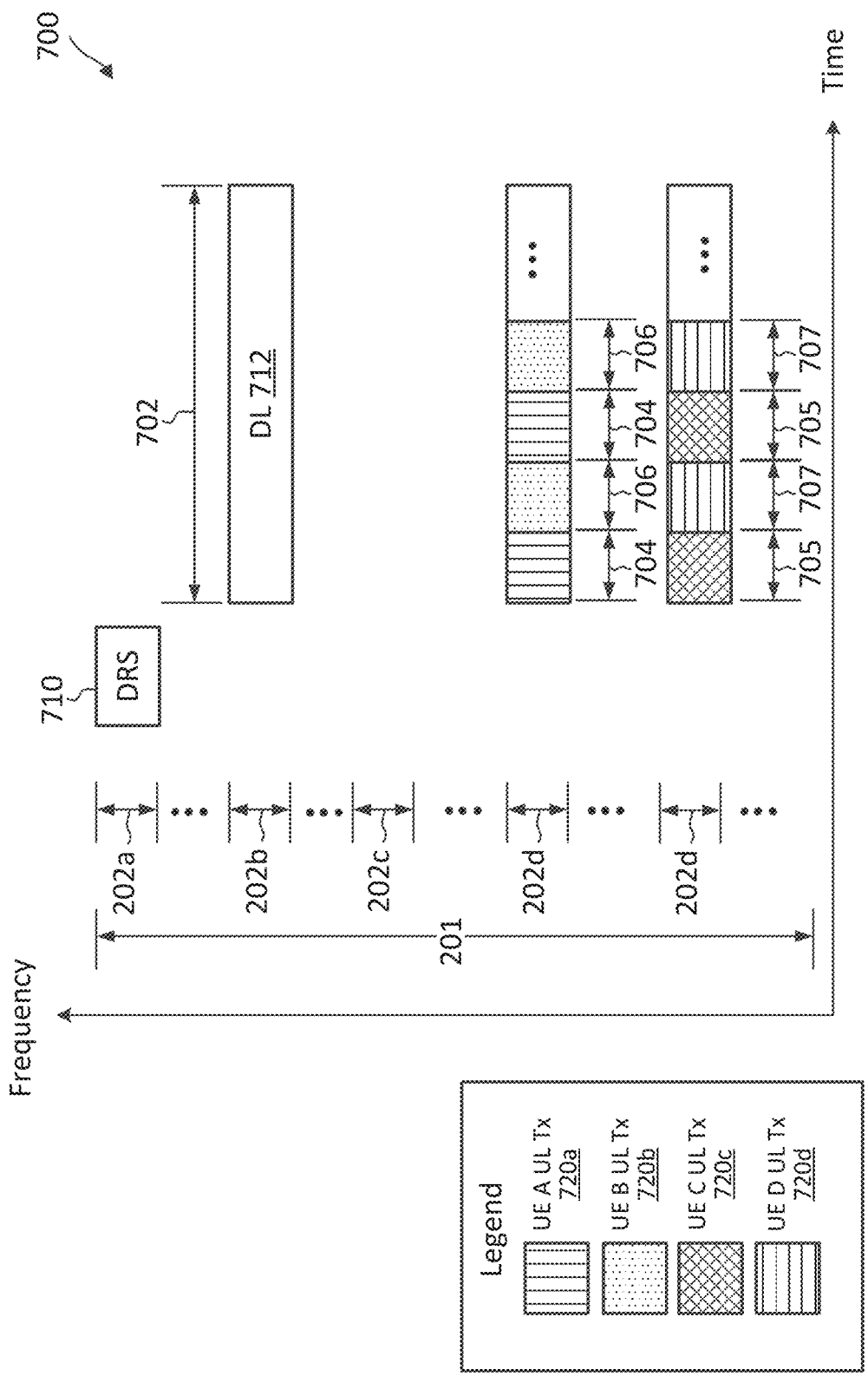
FIG. 7 illustrates a communication scheme with UL transmission on-off patterns according to some aspects of the present disclosure.

FIG. 7 illustrates a communication scheme 700 with UL transmission on-off patterns according to some aspects of the present disclosure. The scheme 700 may be employed by BSs such as the BSs 105 and 400 and UEs such as the UEs 115 and 300 in a network such as the network 100. In particular, a BS may configure UEs with various UL transmission on-off patterns (e.g., the UL transmission on-off pattern 510, 520, 530, 540, 610, and/or 620) and communicate with the UEs as shown in the scheme 700. The scheme 700 can be implemented in conjunction with the schemes 200, 500, and/or 600 discussed above with respect to FIGS. 2, 5, and/or 6, respectively. In FIG. 7, the x-axis represents time in some arbitrary units, and the y-axis represents frequency in some arbitrary units. The scheme 700 is described using a similar transmission on-off pattern structure as in the scheme 200 and may use the same reference numerals for simplicity's sake.

As discussed above, regulations in 2.4 GHz bands mandates frequency-hopping to be applied to transmissions. To facilitate an initial network access, a BS (e.g., the BSs 105 and/or 400) may configure one of the frequency subbands 202 in the frequency band 201 as an anchor channel and may transmit discovery reference signals (e.g., SSBs, PBCH signals, MIBs, SIBs) in the anchor channel. As such, a UE (e.g., the UEs 115 and/or 300) desiring to join the network may monitor the anchor channel. The BS may communicate other DL transmissions with frequency-hopping. The BS may configure a connected UE with multiple UL transmission on-off pattern (e.g., the UL transmission on-off patterns 510, 520, 530, 540, 610, and/or 620) and frequency-hopping.

In the illustrated example, of FIG. 7, the BS configures the frequency subband 202a as an anchor channel and transmits a DRS 710 in the frequency subband 202a. The BS may transmit a DL communication signal 712 in the frequency subband 202b during a DL frame 702. The DL communication signal 712 may include DL data (e.g., PDSCH data) and/or DL control information (DCI) carrying scheduling grants (e.g., PDCCH) for UEs. The BS may apply frequency-hopping for DL transmissions. For instance, the BS may transmit a next DL transmission in the frequency subband 202c. While not shown in FIG. 5, the BS may perform an LBT and may transmit a DL transmission when the LBT is a pass. When the LBT fails, the BS may refrain from accessing the frequency band 201.

The BS may configure a UE A, a UE B, a UE C, and a UE D for communications. The UE A, UE B, UE C, and UE D may be similar to the UEs 115 and/or 300. The BS may configure the UE A and the UE B with non-overlapping UL transmission on-off pattern (e.g., the UL transmission on-off patterns 610 and 602). Additionally, the BS may configure UE C and UE with non-overlapping UL transmission on-off patterns. As such, the BS may time-multiplex UL transmissions of the UE A and the UE B and may time-multiplex UL transmissions of the UE C and the UE D. As shown, in the frequency subband 202c, UE A's UL transmissions 720a are time multiplexed with UE B's UL transmissions 720b. The BS may configure the UE A with a UL transmission on-off pattern having on-durations 704 and off-durations 706. The BS may configure the UE B with a UL transmission on-off pattern having on-durations 706 and off-durations 704. Similarly, in the frequency subband 202d, UE C's UL transmissions 720c are time multiplexed with UE D's UL transmissions 720d. The BS may configure the UE C with a UL transmission on-off pattern having on-durations 705 and off-durations 707. The BS may configure the UE D with a UL transmission on-off pattern having on-durations 707 and off-durations 705. The UL transmissions 720a, 720b, 720c, and 720d may include PUSCH, PUCCH, sounding reference signals (SRSs), and/or configured grant transmissions (e.g., grant-less transmissions not scheduled).

In some aspects, the BS may configure the UE A, UE B, UE C, the UE D each with multiple UL transmission on-off patterns (e.g., the UL transmission on-off pattern 510, 520, 530, 540, 610, and/or 620) and may configure each UE A, UE B, UE C, and UE D with one active UL transmission on-off pattern at any given time. The BS may schedule each UE A, UE B, UE C, the UE D by considering the current active UL transmission on-off pattern and/or a potential UL transmission on-off pattern that the corresponding UE may switch to, for example, to meet a certain transmission timeline as will be discussed further below.

In some aspects, the BS may additionally configure the UE A, UE B, UE C, the UE D each with a frequency-hopping pattern and may schedule the UE A, UE B, UE C, the UE D with UL transmissions based on the frequency-hopping pattern.

Figure 8:
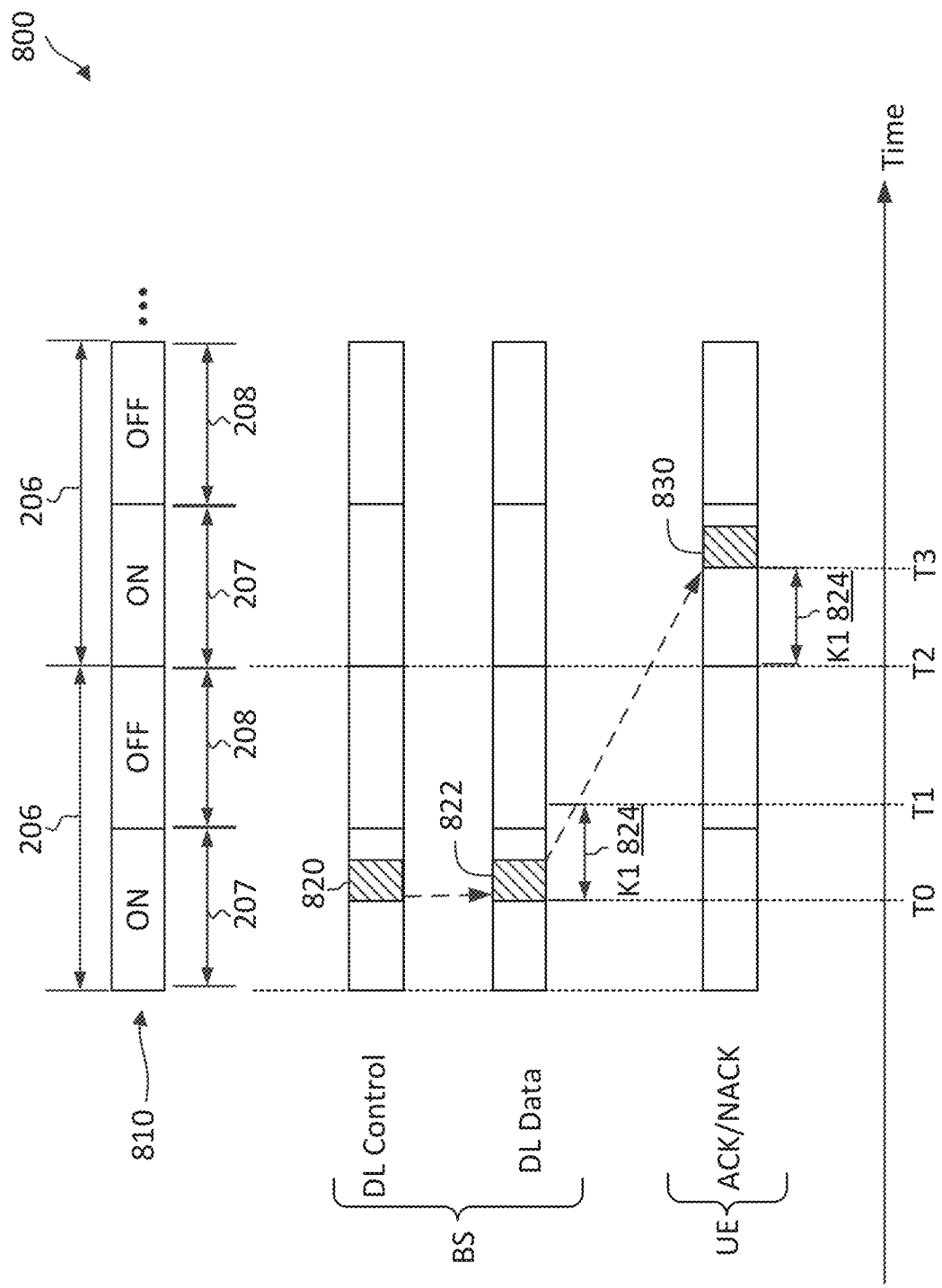
FIG. 8 illustrates a communication scheme with UL transmission on-off patterns according to some aspects of the present disclosure.

FIG. 8 illustrates a communication scheme 800 with UL transmission on-off patterns according to some aspects of the present disclosure. The scheme 800 may be employed by BSs such as the BSs 105 and 400 and UEs such as the UEs 115 and 300 in a network such as the network 100. In particular, a BS may configure UEs with various UL transmission on-off patterns (e.g., the UL transmission on-off pattern 510, 520, 530, 540, 610, and/or 620) and communicate DL transmissions and ACK/NACK feedbacks with the UEs (e.g., in a frequency band 201) as shown in the scheme 800. The scheme 800 can be implemented in conjunction with the schemes 200, 500, 600, and/or 700 discussed above with respect to FIGS. 2, 5, 6, and/or 7, respectively. In FIG. 8, the x-axis represents time in some arbitrary units. The scheme 800 is described using a similar transmission on-off pattern structure as in the scheme 200 and may use the same reference numerals for simplicity's sake.

As discussed above, HARQ techniques can be applied to improve transmission reliabilities, where a receiver may feedback a reception status (e.g., ACK or NACK) to a transmitter and the transmitter may retransmit a transmission upon receiving a NACK. For instance, when a BS (e.g., the BSs 105 and/or 400) schedules a UE with a DL scheduling grant, the BS may also include an ACK/NACK resource indicator (ARI) indicating a resource for a UE (e.g., the UEs 115 and/or 300) to transmit an ACK/NACK feedback for a corresponding DL transmission. For instance, in NR or NR-U, a DL scheduling grant may include a K1 parameter indicating a time offset between the scheduled DL transmission and the ACK/NACK feedback resource. In other words, a UE receiving a DL transmission at, for example, slot n, may transmit an ACK/NACK feedback for the DL transmission at slot (n+K1).

When the BS configures the UE with a UL transmission on-off pattern 810 (e.g., the UL transmission on-off patterns 510, 520, 530, 540, 610, and/or 620) with alternating on-durations 207 and off-durations 208, the UE may receive a DL scheduling grant with a K1 parameter indicating an ACK/NACK resource in an off-duration 208 of the UL transmission on-off pattern 810. To avoid transmission during an off-duration 208, the scheme 800 modifies a reference time point for the K1 parameter (e.g., the K1 parameter 824).

In the illustrated example of FIG. 8, the BS transmits DCI 820 indicating a grant for a DL transmission 822 (e.g., in a frequency subband 202) that begins at time T0. The DCI 820 may also include a K1 parameter 824 indicating an ACK/NACK feedback at time T1. In the context of NR, the DCI 820 may have a DCI format 1_0 or DCI format 1_1. The BS transmits the DL transmission 822 according to the grant. Since the ACK/NACK transmission time indicated by the K1 parameter 824 (e.g., at time T1) falls within an off-duration 208 of the UE's UL transmission on-off pattern 810, the UE may delay the transmission of the ACK/NACK feedback to a next upcoming on-duration 207 so that the UL transmission on-off pattern 810 is maintained. The UE may utilize the first slot of the next upcoming on-duration 207 (e.g., time T2) as a reference for the K1 parameter 824. In other words, the K1 parameter 824 is relative to the first slot of the next upcoming on-duration 207. Thus, the UE transmits an ACK/NACK feedback 830 to the BS at time T3, a delay from time T2 based on the K1 parameter 824. In some aspects, if K1 is greater than the on-duration 207, which may be denoted as X number of slots, the UE may transmit an ACK/NACK feedback 830 at (K1-X)$^{th}$ slot relative to the first slot of an on-duration 207 after the next upcoming on-duration 207. In general, the K1 parameter 824 can be in any time units, such as slots, symbols, and/or ms.

Figure 9:
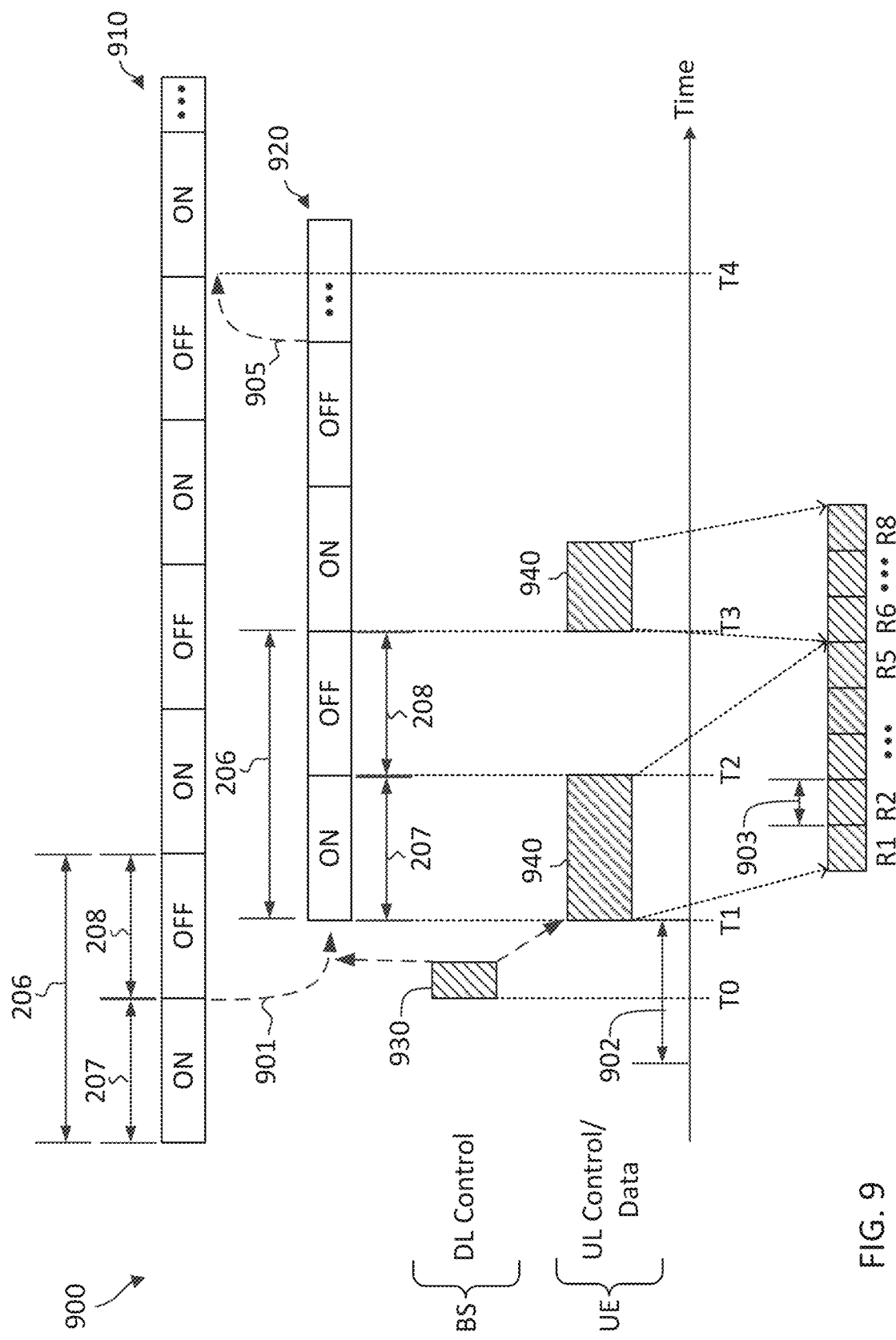
FIG. 9 illustrates a communication scheme with UL transmission on-off pattern switching according to some aspects of the present disclosure.

FIG. 9 illustrates a communication scheme 900 with UL transmission on-off pattern switching according to some aspects of the present disclosure. The scheme 900 may be employed by BSs such as the BSs 105 and 400 and UEs such as the UEs 115 and 300 in a network such as the network 100. In particular, a BS may configure UEs with various UL transmission on-off patterns (e.g., the UL transmission on-off pattern 510, 520, 530, 540, 610, and/or 620) and may dynamically configure the UE to switch to a different UL transmission on-off pattern for UL transmissions (e.g., in a frequency band 201) as shown in the scheme 900. The scheme 900 can be implemented in conjunction with the schemes 200, 500, 600, 700, and/or 800 discussed above with respect to FIGS. 2, 5, 6, 7, and/or 8, respectively. In FIG. 9, the x-axis represents time in some arbitrary units. The scheme 900 is described using a similar transmission on-off pattern structure as in the scheme 200 and may use the same reference numerals for simplicity's sake.

As discussed above, a BS (e.g., the BSs 105 and/or 400) may configure a UE (e.g., the UEs 115 and/or 300) with multiple UL transmission on-off patterns (e.g., the UL transmission on-off patterns 510, 520, 530, 540, 610, 620, and/or 810) and may configure the UE with one active UL transmission on-off pattern at any given time. The BS may schedule the UE for a UL transmission during an on-duration (e.g., the on-durations 207) of the active UL transmission on-off pattern. To provide scheduling flexibility, for example, to meet a certain transmission timeline or quality-of-service (QoS), the BS may schedule the UE for a UL transmission during an off-duration (e.g., the off-durations 208) of the active UL transmission on-off pattern by switching the UE to a different UL transmission on-off pattern, for example, with an on-duration corresponding to the desired scheduling time.

In the illustrated example of FIG. 9, the BS may configure the UE with a UL transmission on-off pattern 910 and a UL transmission on-off pattern 920 that are offset in time from each other. The UL transmission on-off patterns 910 and 920 may be substantially similar to the UL transmission on-off patterns 510, 520, 530, 540, 610, 620, and/or 810. The BS may configure the UL transmission on-off pattern 910 as an active UL transmission on-off pattern for the UE. At time T0, the BS may desire to schedule the UE for a UL transmission 940 (e.g., in a frequency subband 202) beginning at time T1. However, time T1 with within an off-duration of the UL transmission on-off pattern 910. The BS may configure the UE to switch to another UL transmission on-off pattern that may have an on-duration 207 corresponding to the desired scheduled time T1. For instance, the BS may determine that the desired scheduled time T1 matches an on-duration 207 of the UL transmission on-off pattern 920. Thus, the BS may transmit DCI 930 indicating a grant for a UL transmission 940 at time T1. The BS may include in the DCI 930 an instruction to switch to the UL transmission on-off pattern 920 (as shown by the dashed arrows 901).

Upon receiving the DCI 930 with the UL transmission on-off pattern switching instruction, the UE may check that switching to the UL transmission on-off pattern 920 may not violate a UL transmission on-off pattern requirement before switching to the UL transmission on-off pattern 920. For instance, the UE may determine whether the UE has any UL transmission within a time period 902 immediately before a start time or scheduled time (e.g., T1) indicated by the DCI 930. The UE may determine the time period 902 based on the off-duration 208 of the UL transmission on-off pattern 920. In other word, the time period 902 should be greater than or equal to the off-duration 208 of UL transmission on-off pattern 920. For instance, the UE has no UL transmission during the time period 902. Thus, the UE may switch to the UL transmission 940 on-off pattern 920 and transmit the UL transmission 940.

In some aspects, the BS may schedule the UE to transmit the UL transmission 940 (e.g., PUSCH or PUCCH) with repetitions. As an example, the BS may schedule the UE with a repetition of 8, where each repetition may be transmitted in one slot 903. As shown, the on-duration 207 of the UL transmission on-off pattern 910 may include 5 slots, which may allow for 5 repetitions. Thus, the UE may transmit 5 repetitions (shown as R1, R2, . . . , R5) during a first on-duration 207 beginning at time T1. After transmitting the 5 repetitions, the UE may remain silence for the off-duration 208 between time T2 and T3. The UE may transmit the remaining 3 repetitions (shown as R6 to R8) in the next on-duration 207 of the UL transmission on-off pattern 920 beginning at time T3. After completing the transmission of all 8 repetitions, the UE may switch back to the UL transmission on-off pattern 910. Since the UE just completed the UL transmission (the repetitions R6-R8), the UE may remain silence for at least an off-duration 208 of the UL transmission on-off pattern 920 and switches to a next on-duration 207 of the UL transmission on-off pattern 910 at time T4 (as shown by the dashed arrows 905). After switching back to the UL transmission on-off pattern 910, the UE may continue to utilize the UL transmission on-off pattern 910 for UL transmissions (as scheduled by the BS).

In some aspects, the BS may utilize the scheme 900 to switch the UE from the active UL transmission on-off pattern 910 to the UL transmission on-off pattern 920 when there is an urgent UL transmission needed (e.g., a short burst of data with high QoS). In some aspects, the BS may utilize the scheme 900 to switch the UE from the active UL transmission on-off pattern 910 to the UL transmission on-off pattern 920 to shorten an ACK/NACK feedback (e.g., the ACK/NACK feedback 830) timing or delay. In another words, the BS may include a UL transmission on-off pattern switching instruction in a DL scheduling grant (e.g., the DCI 820) so that the UE may transmit an ACK/NACK feedback at an earlier time (during an on-duration of another UL transmission on-off pattern). For instance, the BS may indicate the UL transmission on-off pattern switching instruction as part of an ARI.

Accordingly, in some instances, the BS may select a UL transmission on-off pattern from the configured UL transmission on-off patterns based on a start time or desired scheduled time for an ACK/NACK feedback (e.g., in a PUCCH transmission or a PUSCH transmission). In the context of NR or NR-U, the BS may include a K2 parameter in a UL scheduling grant to indicate a start time of a scheduled UL transmission, where K2 is a time offset relate to the transmission start time of the UL scheduling grant (e.g., the DCI 930). For DL scheduling, the BS may include a K1 parameter (e.g., the K1 parameter 824) in a DL scheduling grant (e.g., the DCI 820) to indicate a start time of a ACK/NACK feedback for a corresponding scheduled DL transmission. Accordingly, the BS may select a UL transmission on-off pattern from the configured UL transmission on-off patterns based on a K2 parameter for PUSCH scheduling and a K1 parameter for PDSCH scheduling. For instance, the BS may select a UL transmission on-off pattern with an on-duration (e.g., the one-durations 207) that is closes, but before the K1 indicated slot or the K2 indicated slot.

In some aspects, the BS may transmit the UL transmission on-off pattern switching instruction via RRC signaling, medium access control-control element (MAC-CE) signaling, or DCI signaling. In some aspects, the UL transmission on-off pattern switching can be a temporary switch until the scheduled UL transmission is completed as shown in FIG. 9.

In some aspects, when the UE detects that a UL schedule violates a UL transmission on-off pattern, the UE may refrain from transmitting based on the UL schedule. For example, at time T0, upon receiving the DCI 930 scheduling the UL transmission 940, the UE may determine that the UE transmitted a UL transmission within the period 902. Thus, to avoid violating the UL transmission on-off pattern 920, which may be based on a regulation, the UE may refrain from switching to the UL transmission on-off pattern 920 and skip the UL transmission 940.

In some aspects, to avoid the BS and the UE being out-of-sync (e.g., in terms of which UL transmission on-off pattern is being used at the BS and which UL transmission on-off pattern is being used at the UE), the BS may start a timer (or counter) after transmitting an instruction to switch to a UL transmission on-off pattern. If the BS does not receive a UL transmission from the UE after switching to UL transmission on-off pattern within an expiration duration of the timer, the BS may fall back to a previous UL transmission on-off pattern. Mechanisms for utilizing a fallback timer will be discussed further below in FIG. 12.

Figure 10:
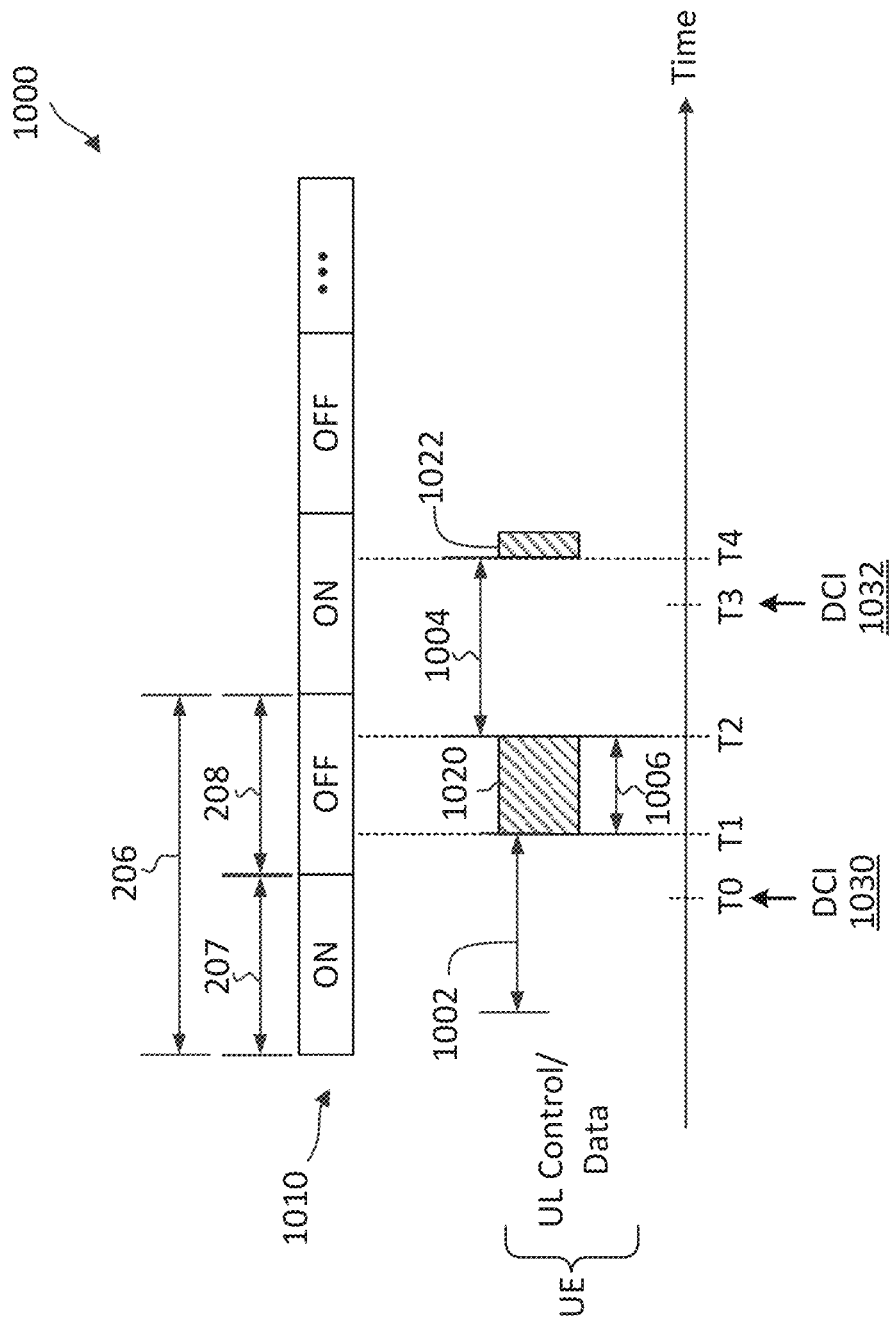
FIG. 10 illustrates a communication scheme with UL transmission on-off pattern overriding according to some aspects of the present disclosure.

FIG. 10 illustrates a communication scheme 1000 with UL transmission on-off pattern overriding according to some aspects of the present disclosure. The scheme 1000 may be employed by BSs such as the BSs 105 and 400 and UEs such as the UEs 115 and 300 in a network such as the network 100. In particular, a BS may configure UEs with various UL transmission on-off patterns (e.g., the UL transmission on-off pattern 510, 520, 530, 540, 610, and/or 620) and may configure the UE to override an off-duration (e.g., the off-durations 208) of a UL transmission on-off pattern for a short burst UL transmission (e.g., in a frequency band 201) as shown in the scheme 1000. The scheme 1000 can be implemented in conjunction with the schemes 200, 500, 600, 700, 800, and/or 900 discussed above with respect to FIGS. 2, 5, 6, 7, 8, and/or 9, respectively. In FIG. 10, the x-axis represents time in some arbitrary units. The scheme 1000 is described using a similar transmission on-off pattern structure as in the scheme 200 and may use the same reference numerals for simplicity's sake.

In some aspects, time-sensitive data (e.g., urgent data with a stringent time constraint) may have a transmission duration less than 5 ms (e.g., about 1 ms or less, about 2 ms, about 3 ms, about 4 ms) and may be sparse in time. In the scheme 1000, when a UL transmission duration is short (e.g., less than 5 ms), the BS may configure the UE to override an active UL transmission on-off pattern (e.g., the UL transmission on-off pattern 510, 520, 530, 540, 610, 620, 810, 910, and/or 920).

In the illustrated example of FIG. 10, the BS may configure the UE with an active UL transmission on-off pattern 1010 similar to the UL transmission on-off pattern 510, 520, 530, 540, 610, 620, 810, 910, and/or 920. At time T0, the BS may schedule the UE to transmit a UL transmission 1020 (e.g., PUSCH and/or PUCCH) at time T1. The time T1 falls within an off-duration 208 of the UL transmission on-off pattern 1010. Since the UL transmission 1020 have a short duration 1006 (less than an on-duration 207 of the UL transmission on-off pattern 1010), the BS may transmit a DCI 1030 (e.g., the DCI 930) including a UL transmission on-off pattern override instruction for the UL transmission 1020. The override instruction instructs the UE to disregard the UL transmission on-off pattern 1010 for the UL transmission 1020.

In order to maintain the UL transmission on-off pattern 1010, the UE may check whether the UE has any UL transmission within a time period 1002 immediately before the time T0 scheduled or granted by the BS. The time period 1002 may have a duration of the off-duration 208 of the UL transmission on-off pattern 1010. For instance, the UE has no UL transmission during the time period 1002. Thus, the UE may proceed with transmitting the UL transmission 1020 beginning at time T1 as scheduled by the BS. If the UE determines that there is not a sufficient transmission time gap (of the off-duration 208) from a previous UL transmission transmitted during an on-duration 207 (within the period 1002), the UE may not accept the override instruction and skip transmitting the UL transmission 1020.

Once the UE overrides the off-duration 208 of the UL transmission on-off pattern 1010, the UE may wait for a transmission gap that is least the duration of the off-duration 208 after completing the UL transmission 1020. For instance, at time T3, the BS may subsequently send another DCI 1032 (e.g., the DCI 930 and 1030) to schedule the UE for a UL transmission 1022 at time T4. The time T4 is within an on-duration 207 of the UL transmission on-off pattern 1010. Since the UE overrides an off-duration 208 for the most recent UL transmission 1020, the UE may check whether there is a sufficient amount of silence transmission gap since the last UL transmission 1020. For instance, the time duration 1004 between the end of the last UL transmission 1020 (e.g., at time T2) and the scheduled start time T3 is greater than or equal to the off-duration 208. Thus, the UE may proceed to transmit the UL transmission 1022 beginning at the scheduled time T4. If the UE determines that the duration 1004 is shorter that the required transmission gap or off-duration 208 required by the UL transmission on-off pattern 1010, the UE may refrain from transmitting the UL transmission 1022 even though the scheduled is within an on-duration 207 of the UL transmission on-off pattern 1010.

Figure 11:
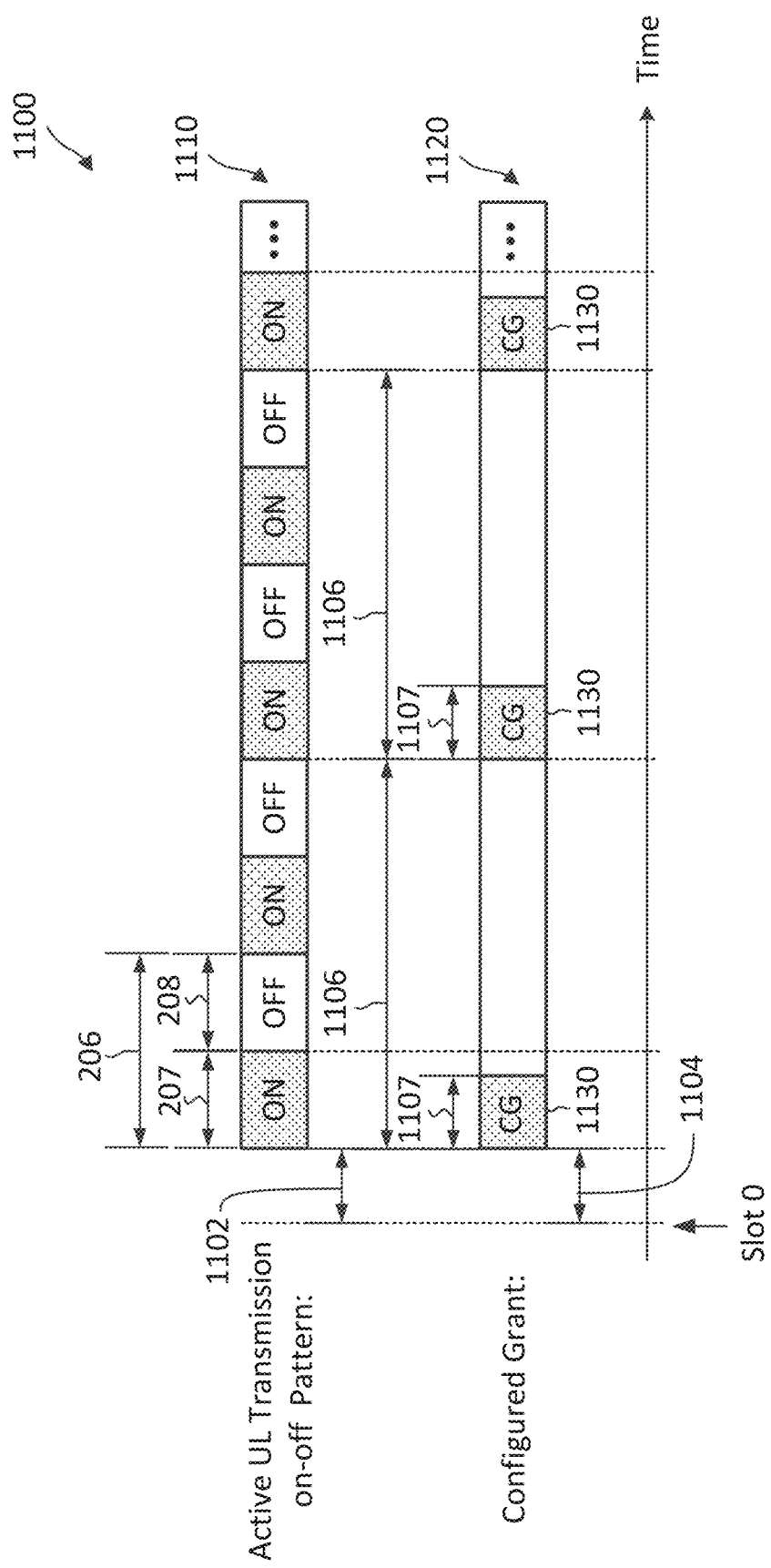
FIG. 11 illustrates a configured grant (CG) configuration scheme according to some aspects of the present disclosure.

FIG. 11 illustrates a CG configuration scheme 1100 according to some aspects of the present disclosure. The scheme 1100 may be employed by BSs such as the BSs 105 and 400 and UEs such as the UEs 115 and 300 in a network such as the network 100. In particular, a BS may configure UEs with various UL transmission on-off patterns (e.g., the UL transmission on-off pattern 510, 520, 530, 540, 610, 620, 810, 910, 920, and/or 1010) and a CG that aligns to a certain a UL transmission on-off pattern (e.g., a default UL transmission on-off pattern) as shown in the scheme 1100. The scheme 1100 can be implemented in conjunction with the schemes 200, 500, 600, 700, 800, 900, and/or 1000 discussed above with respect to FIGS. 2, 5, 6, 7, 8, 9, and/or 10, respectively. In FIG. 11, the x-axis represents time in some arbitrary units. The scheme 1100 is described using a similar transmission on-off pattern structure as in the scheme 200 and may use the same reference numerals for simplicity's sake.

In NR, a BS (e.g., the BSs 105 and/or 400) may configured a UE (e.g., the UEs 115 and/or 300) with a set of resource spaced apart in time (e.g., by a certain time interval) configured for one or more UL CG transmissions (e.g., in a frequency subband 202). The UE may use any of the CG resources for transmission without having to receive an individual grant from the BS for each CG resource. When the UE is configured with a UL transmission on-off pattern 1110 (e.g., the UL transmission on-off pattern 510, 520, 530, 540, 610, 620, 810, 910, 920, and/or 1010), the UE is to maintain the UL transmission on-off pattern 1110 so that the UE's transmissions may satisfy a certain regulation in the frequency band. Thus, in the scheme 1100, the BS may configure the UE with CG resources that closely match the UL transmission on-off pattern 1110. For instance, the BS may configure a CG grant with resources having a duration that is less than the on-duration 207 of the UL transmission on-off pattern 1110. The BS may configure the CG resources with a periodicity that is greater than the periodicity 206 of the UL transmission on-off pattern 1110 or multiples of the periodicity 206UL transmission on-off pattern 1110. The BS may adjust a time offset for the CG resources such that each CG resource is within an on-duration 207 of the UL transmission on-off pattern 1110.

In the illustrated example of FIG. 11, the BS configures the UE with a CG grant indicating a set of CG resources 1130 that are spaced apart in time as shown by 1120, for example, with a periodicity 1106 that is two times the periodicity 206 of the UL transmission on-off pattern 1110. Each CG resource 1130 may have a duration 1107 that is shorter than an on-duration 207 of the UL transmission on-off pattern 1110. The BS may configure the UL transmission on-off pattern 1110 with a time offset 1102 relative to a reference time (e.g., shown as slot 0). The BS may configure the set of CG resources 1130 with a time offset 1104 similar to the time offset 1102 or the same as the time offset 1102 such that the CG resources 1130 may be aligned to the on-durations 207 of the UL transmission on-off pattern 1110.

In some aspects, the BS may configure the UE with the set of CG resources 1130 via RRC signaling. For instance, the BS may configure the UE with an RRC configuration indicating a starting time location (or time offset 1104) for the CG resources 1130, a periodicity 1106 of the CG resources 1130, a duration 1107 of each CG resources 1130, a number of a RBs and/or RB indices indicating the location of the RBs in frequency band.

While the scheme 1100 is described in the context of configuring a CG to match a certain UL transmission on-off pattern 1110, the BS may apply substantially similar mechanisms to configure the UE with configured or scheduled UL signaling. Some examples of periodic UL signaling or semi-persistent UL signaling may include SR, P-CSI, SP-CSI, P-SRS, and/or SP-SRS. For instance, the BS may configure the UE with a set of SR transmit resources or occasions that repeats in time at a certain periodicity. The UE may transmit an SR in an SR transmit occasions to request for an UL grant from the BS. The BS may configure the UE with a set of P-CSI or SP-CSI transmit occasions that repeats in time at a certain periodicity. The UE may transmit a CSI report (e.g., including precoding matrix information (PMI), channel quality indicator (CQI), and/or rank indication) in a P-CSI or SP-CSI transmit occasions to assist the BS in DL beamforming and/or scheduling. The BS may configure the UE with a set of P-SRS or SP-SRS transmit occasions that repeats in time at a certain periodicity. The UE may transmit an SRS (e.g., a predetermined signal sequence) in a P-SRS or SP-SRS transmit occasions to assist the BS in determining channel measurements in an UL direction for UL scheduling. In order to efficiently use the resources or transmit occasions scheduled for UL signaling with a default or active UL transmission on-off pattern (e.g., the UL transmission on-off pattern 1110) configured at the UE, the BS may determine the periodicity and/or the duration of the UL signaling transmit occasions such that the scheduled UL signaling transmit occasions are closely matched to the default or active UL transmission on-off pattern.

In some aspects, the BS may instruct the UE to temporarily switch to another UL transmission on-off pattern different from the default active UL transmission on-off pattern. During the time when the other UL transmission on-off pattern is active, the CG resources and/or the UL signaling transmit occasions that were configured to match the default UL transmission on-off pattern may not be aligned the currently active UL transmission on-off pattern. When a CG resource is not within an on-duration of the currently active UL transmission on-off pattern, the UE may defer a CG transmission to a next CG resource that is within an-duration of the currently active UL transmission on-off pattern. Similarly, when a UL signaling transmit occasion is not within an on-duration of the currently active UL transmission on-off pattern, the UE may defer a UL signaling transmission to a next CG resource that is within an-duration of the currently active UL transmission on-off pattern.

In some aspects, a BS (e.g., the BSs 105 and/or 400) may configure a UE (e.g., the UEs 115 and/or 300) with any suitable combination of the schemes 200, 500, 600, 700, 800, 900, 1000, and/or 1100 discussed above with respect to FIGS. 2, 5, 6, 7, 8, 9, 10, and/or 11, respectively. In some instances, the BS and the UE may utilize all the schemes 200, 500, 600, 700, 800, 900, 1000, and/or 1100. In some instances, the BS and the UE may utilize the scheme 200 (for UL frequency-hopping), the scheme 500 (for multiple UL transmission on-off patterns), and the scheme 900 (for dynamic UL transmission on-off pattern switching). In some instances, the BS and the UE may utilize the scheme 200 (for UL frequency-hopping), the scheme 500 (for multiple UL transmission on-off patterns), the scheme 900 (for dynamic UL transmission on-off pattern switching), and the scheme 1100 (for CG configurations and/or UL signaling transmission occasion scheduling).

Figure 12:
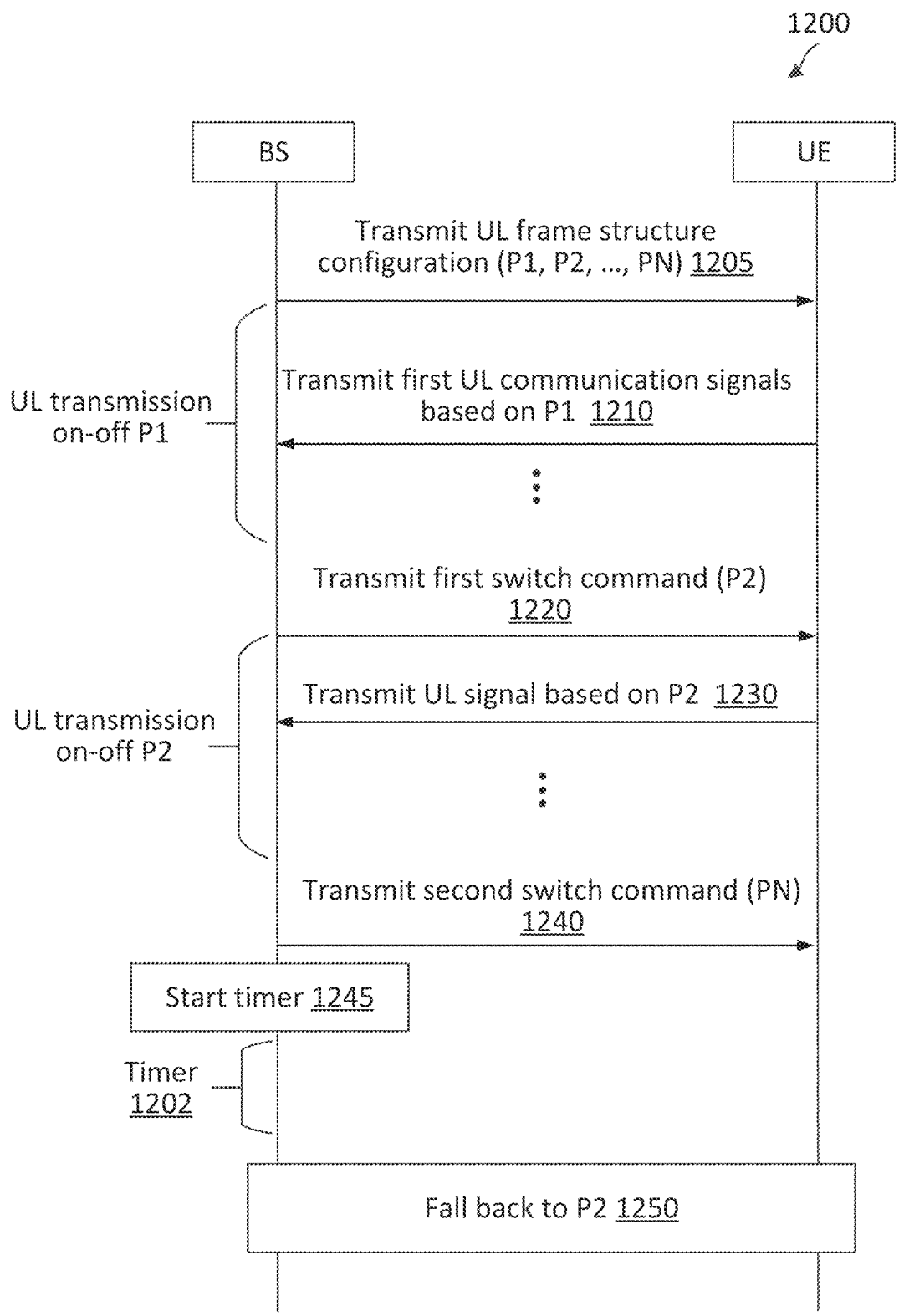
FIG. 12 is a signaling diagram of a communication method with UL transmission on-off patterns according to some aspects of the present disclosure.

FIG. 12 is a signaling diagram of a communication method 1200 with UL transmission on-off patterns according to some aspects of the present disclosure. The method 1200 may be implemented between a BS (e.g., BSs 105 and/or 400) and a UEs (e.g., UEs 115 and/or 300) shown. The method 1200 may employ similar mechanisms as in the schemes 200, 500, 600, 700, 800, 900, 1000, and/or 1100 discussed above with respect to FIGS. 2, 5, 6, 7, 8, 9, 10, and/or 11, respectively. As illustrated, the method 1200 includes a number of enumerated steps, but aspects of the method 1200 may include additional steps before, after, and in between the enumerated steps. In some aspects, one or more of the enumerated steps may be omitted or performed in a different order.

At action 1205, the BS transmits a UL frame structure configuration to the UE. The UL frame structure configuration may indicate a plurality of UL transmission on-off patterns that are offset from each other in time. The UL transmission on-off patterns may be similar to the UL transmission on-off patterns 510, 520, 530, 540, 610, 620, 810, 910, 920, 1010, and/or 1100. For example, the UL transmission on-off patterns may be referred to as P1, P2, to PN. The UL frame structure configuration may also indicate that the UL transmission on-off pattern P1 is a default UL transmission on-off pattern. In other words, the BS may identify the UL transmission on-off pattern P1 as a default pattern for the UE and indicate the pattern P1 to the UE. Accordingly, the UE may receive the UL frame structure configuration from the BS and identify the default pattern P1 from the plurality of UL transmission on-off patterns. In some instances, the BS may utilize one or more components, such as the processor 402, the UL communication module 408, the transceiver 410, the modem 412, and/or the one or more antennas 416, to transmit the UL frame structure configuration to the UE.

At action 1210, the UE transmits one or more first UL communication signals (e.g., PUSCH, PUCCH, SRSs) using the UL transmission on-off pattern P1. The UE may transmit the first UL communication signals based on dynamic schedules received from the BS (e.g., via DCI), configured grants received from the (e.g., via RRC), periodic or semi-persistent UL signaling schedules received from the (e.g., via RRC). In some instances, the UE may utilize one or more components, such as the processor 302, the UL communication module 308, the transceiver 310, the modem 312, and/or the one or more antennas 316, to transmit the one or more first UL communication signals.

At action 1220, the BS transmits a first switch command to switch the UE to a different configured UL transmission on-off pattern (e.g., P2). The BS may determine the switch based on a scheduling need (e.g., to serve time-sensitive data or shorten a HARQ feedback) and may select the UL transmission on-off pattern P2 based on a scheduling parameter (e.g., K1 or K2) as discussed above in scheme 900 with reference to FIG. 9. In some instances, the BS may utilize one or more components, such as the processor 402, the UL communication module 408, the transceiver 410, the modem 412, and/or the one or more antennas 416, to transmit the first switch command.

At action 1230, the UE transmits one or more second UL communication signals (e.g., PUSCH, PUCCH, SRSs) using the UL transmission on-off pattern P2. Similarly, the UE may transmit the second UL communication signals based on dynamic schedules received from the BS (e.g., via DCI), configured grants received from the (e.g., via RRC), periodic or semi-persistent UL signaling schedules received from the (e.g., via RRC). In some instances, the UE may utilize one or more components, such as the processor 302, the UL communication module 308, the transceiver 310, the modem 312, and/or the one or more antennas 316, to transmit the one or more second UL communication signals.

In some aspects, the UE may determine whether to transmit a second UL communication signal based on whether the transmission of the second UL may violate the UL transmission on-off pattern P2 as discussed above in scheme 900 with reference to FIG. 9. In some instances, the UE may utilize one or more components, such as the processor 302, the UL communication module 308, the transceiver 310, the modem 312, and/or the one or more antennas 316, to determine to whether to transmit a second UL communication based on whether the transmission of the second UL may violate the UL transmission on-off pattern P2. For instance, the UE may record a history of UL transmission or a transmission end time of a most recent transmission in a memory (e.g., the memory 304). When the UE receives a schedule grant for the second UL communication signal, the UE may determine whether there is any UL transmission within a time period (e.g., the time period 902 and 1002) immediately before a start time of the second UL communication signal. For instance, if the time period (e.g., a transmission gap) is longer than an off-duration (e.g., the off-duration 208) of the UL transmission on-off pattern P2, the UE may proceed with the transmission. If the time period is shorter than an off-duration of the UL transmission on-off pattern P2, the UE may skip the second UL communication signal transmission.

At action 1240, the BS transmits a second switch command to switch the UE to the UL transmission on-off pattern PN. In some instances, the BS may utilize one or more components, such as the processor 402, the UL communication module 408, the transceiver 410, the modem 412, and/or the one or more antennas 416, to transmit the second switch command.

At action 1245, after transmitting the second switch command, the BS starts a timer 1202 or configures a timer. The BS may configure the timer with an expiration duration (e.g., about 5 ms, 10 ms, 20 ms, or more). If the BS has not received any UL transmission from the UE when the timer expires, the BS may switch back to the previous UL transmission on-off pattern P2. In some instances, the BS may utilize one or more components, such as the processor 402, to start a counter count to count up or count down based on the expiration duration.

At action 1250, upon an expiration of the timer 1202, the BS may determine that there is no UL transmission from the UE over the duration of the timer expiration duration. Thus, the BS may fall back to the UL transmission on-off pattern P2 and schedule the UE for UL transmission using the UL transmission on-off pattern P2. In some instances, the BS may utilize one or more components, such as the processor 402, the UL communication module 408, the transceiver 410, the modem 412, and/or the one or more antennas 416, to monitor for a second UL communication signal. For example, the second UL communication signal may include a predetermined sequence (e.g., a demodulation reference signal (DMRS)). The BS may determine whether the predetermined sequence is detected from the channel by computing a correlation between a signal received from the channel and the predetermined sequence and applying a correlation threshold to the computed correlation. If the computed correlation value is above the correlation threshold, the BS determines that the predetermined sequence is detected. Otherwise, if the computed correlation value is below the correlation threshold, the BS determines that the predetermined sequence is not detected.

Figure 13:
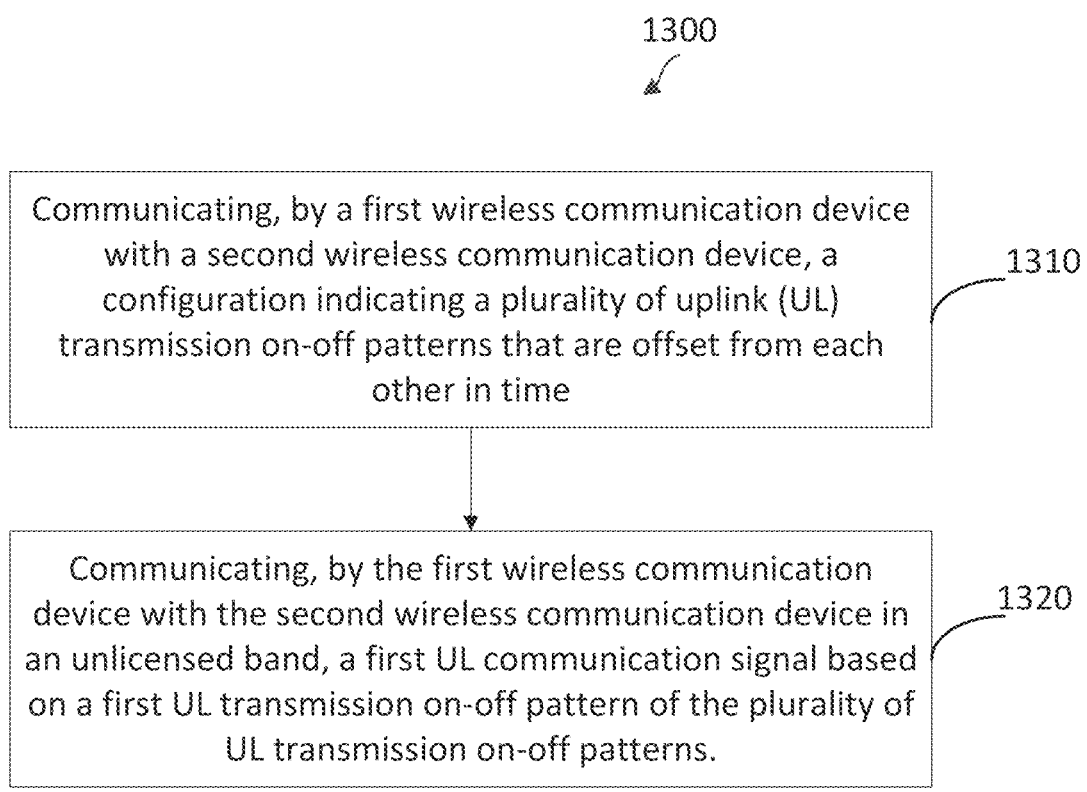
FIG. 13 is a flow diagram of a wireless communication method according to some aspects of the present disclosure.

FIG. 13 is a flow diagram of a wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as the UEs 115 and/or 300, may utilize one or more components, such as the processor 302, the memory 304, the UL communication module 308, the transceiver 310, the modem 312, and the one or more antennas 316, to execute the steps of method 1300. Alternatively, a wireless communication device, such as the BSs 105 and/or 400, may utilize one or more components, such as the processor 402, the memory 404, the UL communication module 408, the transceiver 410, the modem 412, and the one or more antennas 416, to execute the steps of method 1300. The method 1300 may employ similar mechanisms as in the schemes 200, 500, 600, 700, 800, 900, 1000, and/or 1100 discussed above with respect to FIGS. 2, 5, 6, 7, 8, 9, 10, and/or 11, respectively, and the method 1200 discussed above with respect to FIG. 12. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a first wireless communication device communicates, with a second wireless communication device, a configuration indicating a plurality of UL transmission on-off patterns that are offset from each other in time. The UL transmission on-off patterns may be similar to the 510, 520, 530, 540, 610, 620, 810, 910, 920, 1010, and/or 1100. In some instances, the first wireless communication device may utilize one or more components, such as the processor 302 or 402, the UL communication module 308 or 408, the transceiver 310 or 410, the modem 312 or 412, and/or the one or more antennas 316 or 416, to communicate the configuration indicating the plurality of UL transmission on-off patterns.

In some aspects, the configuration may indicate at least one of an on-duration (e.g., the on-durations 207), an off-duration (e.g., the off-duration 208), a periodicity (e.g., the periodicity 206), and/or a time offset (e.g., the time offsets 522, 532, 542, 602, 604, and/or 1102) for each UL transmission on-off pattern of the plurality of UL transmission on-off patterns.

At block 1320, the first wireless communication device communicates, with the second wireless communication device in an unlicensed band (e.g., the frequency band 201), a first UL communication signal (e.g., a PUCCH signal and/or a PUSCH signal) based on a first UL transmission on-off pattern of the plurality of UL transmission on-off patterns. In some instances, the first wireless communication device may utilize one or more components, such as the processor 302 or 402, the UL communication module 308 or 408, the transceiver 310 or 410, the modem 312 or 412, and/or the one or more antennas 316 or 416, to communicate the first UL communication signal in the unlicensed band based on the first UL transmission.

In some aspects, the first wireless communication device may correspond to a BS (e.g., the BSs 105 and/or 400) and the second wireless communication device may correspond to a UE (e.g., the UEs 115 and/or 300). The communicating the configuration at block 1310 may include transmitting, by the BS to the UE, the configuration. The communicating the first UL communication signal at block 1320 may include receiving, by the BS from the UE, the first UL communication signal.

In some aspects, the first wireless communication device may correspond to a UE (e.g., the UEs 115 and/or 300) and the second wireless communication device may correspond to a BS (e.g., the BSs 105 and/or 400). The communicating the configuration at block 1310 may include receiving, by the UE to the BS, the configuration. The communicating the first UL communication signal at block 1320 may include transmitting, by the UE to the BS, the first UL communication signal.

In some aspects, the first wireless communication device may also communicate, with the second wireless communication device, an instruction to switch to a second UL transmission on-off pattern of the plurality of UL transmission on-off patterns for example, as shown in the scheme 900 described above with reference to FIG. 9. In some instances, the first wireless communication device may utilize one or more components, such as the processor 302 or 402, the UL communication module 308 or 408, the transceiver 310 or 410, the modem 312 or 412, and/or the one or more antennas 316 or 416, to communicate the instruction to switch to the second UL transmission on-off pattern. In some aspects, the first wireless communication device may communicate a UL scheduling grant including the UL transmission on-off pattern switching instruction and a schedule for a second UL communication signal. The second UL transmission on-off pattern may be selected from the plurality of UL transmission on-off patterns based on a transmission start time (e.g., associated with a K2 parameter in NR) scheduled for the second UL communication signal. The first wireless communication device may switch back to the first UL transmission on-off pattern after communicating the second UL communication signal. In some aspects, the first wireless communication device may communicate a DL scheduling grant including the UL transmission on-off pattern switching instruction and a schedule for a DL communication signal. The second UL transmission on-off pattern may be selected from the plurality of UL transmission on-off patterns based on a transmission start time (e.g., associated with a K1 parameter in NR) scheduled for a HARQ ACK/NACK feedback associated with the DL communication signal.

In some aspects, the first wireless communication device may communicate, with the second wireless communication device, a second UL communication signal during an off-duration of the first UL transmission on-off pattern based on a duration of the second UL communication signal, for example, as shown in the scheme 1000 described above with reference to FIG. 10. In some instances, the first wireless communication device may utilize one or more components, such as the processor 302 or 402, the UL communication module 308 or 408, the transceiver 310 or 410, the modem 312 or 412, and/or the one or more antennas 316 or 416, to communicate the second UL communication signal.

In some aspects, the first wireless communication device may communicate, with the second wireless communication device, a CG indicating a plurality of CG resources (e.g., the CG resources 1130), where each CG resource of the plurality of CG resources is within an on-duration (e.g., the on-durations 207) of the first UL transmission on-off pattern, for example, as shown in the scheme 1100 described above with reference to FIG. 11. In some instances, the first wireless communication device may utilize one or more components, such as the processor 302 or 402, the UL communication module 308 or 408, the transceiver 310 or 410, the modem 312 or 412, and/or the one or more antennas 316 or 416, to communicate the CG.

In some aspects, the first wireless communication device may communicate, with the second wireless communication device, an indication of a plurality of UL transmission occasions for at least one of a SR, P-CSI, SP-CSI, P-SRS, and/or SP-SRS, where each UL transmission occasion of the plurality of UL transmission occasions is within one or more on-durations of the first UL transmission on-off pattern. In some instances, the first wireless communication device may utilize one or more components, such as the processor 302 or 402, the UL communication module 308 or 408, the transceiver 310 or 410, the modem 312 or 412, and/or the one or more antennas 316 or 416, to communicate the indication of the plurality of UL transmission occasions.

In some aspects, the first wireless communication device may communicate the first UL communication signal in a first frequency subband (e.g., the frequency subband 202a) within the unlicensed band. The first wireless communication device may communicate the first UL communication signal in a second frequency subband (e.g., the frequency subband 202b) based on a frequency-hopping pattern, for example, as shown in the scheme 200 described above with reference to FIG. 2.

Further aspects of the present disclosure include a method of wireless communication. The method of wireless communication includes communicating, by a first wireless communication device with a second wireless communication device, a configuration indicating a plurality of uplink (UL) transmission on-off patterns that are offset from each other in time; and communicating, by the first wireless communication device with the second wireless communication device in an unlicensed band, a first UL communication signal based on a first UL transmission on-off pattern of the plurality of UL transmission on-off patterns.

The method may also include one or more of the following features. For instance, the method may further include where the configuration indicates at least one of an on-duration, an off-duration, a periodicity, or a time offset for the first UL transmission on-off pattern. The method may further include determining, by the first wireless communication device, a schedule for the first UL communication signal based on an on-duration of the first UL transmission on-off pattern. The communicating the configuration includes communicating, by the first wireless communication device with the second wireless communication device, the configuration indicating the plurality of UL transmission on-off patterns via radio resource control (RRC) signaling. The method may further include communicating, by the first wireless communication device with the second wireless communication device, an instruction to switch to a second UL transmission on-off pattern of the plurality of UL transmission on-off patterns. The communicating the instruction includes communicating, by the first wireless communication device with the second wireless communication device, the instruction to switch to the second UL transmission on-off pattern via at least one of radio resource control (RRC) signaling, media access control (MAC) control element (CE) signaling, or downlink control information (dci) signaling. The method may further include communicating, by the first wireless communication device with the second wireless communication device in response to the instruction, a second UL communication signal based on the second UL transmission on-off pattern. The communicating the instruction includes communicating, by the first wireless communication device with the second wireless communication device, an UL scheduling grant for the second UL communication signal, the UL scheduling grant including the instruction to switch to the second UL transmission on-off pattern. The communicating the instruction includes communicating, by the first wireless communication device with the second wireless communication device, a downlink (DL) scheduling grant including the instruction to switch to the second UL transmission on-off pattern; the method further includes communicating, by the first wireless communication device with the second wireless communication device in response to the DL scheduling grant, a downlink (DL) communication signal; and the communicating the second UL communication signal includes communicating, by the first wireless communication device with the second wireless communication device, an acknowledgement/negative-acknowledgement (ACK/NACK) feedback for the DL communication signal. The first wireless communication device is a user equipment (UE), the method may further include switching, by the first wireless communication device, to the second UL transmission on-off pattern in response to a determination that there is no UL transmission within a time period immediately before a start time of the second UL communication signal, the time period being greater than or equal to an off-duration of the second UL transmission on-off pattern. The method may further include switching, by the first wireless communication device, from the second UL transmission on-off pattern to the first UL transmission on-off pattern after communicating the second UL communication signal. The communicating the second UL communication signal includes communicating, by the first wireless communication device with the second wireless communication device, the second UL communication signal during at least two on-durations of the second UL transmission on-off pattern that are spaced apart by an off-duration of the second UL transmission on-off pattern. The first wireless communication device is a base station (BS), the method may further include selecting, by the first wireless communication device, the second UL transmission on-off pattern from the plurality of UL transmission on-off patterns based on a start time of the second UL communication signal. The first wireless communication device is a base station (BS), the method may further include configuring, by the BS, a timer in response to communicating the instruction to switch to the second UL transmission on-off pattern. The method may further include switching, by the BS, from the second UL transmission on-off pattern to the first UL transmission on-off pattern in response to an expiration of the timer. The communicating the first UL communication signal includes communicating, by the first wireless communication device with the second wireless communication device in response to the DL communication signal, an ACK/NACK feedback during an on-duration of the first UL transmission on-off pattern, the first UL communication signal being offset from a start of the on-duration by the ACK/NACK offset. The method may further include communicating, by the first wireless communication device with the second wireless communication device, a second UL communication signal during an off-duration of the first UL transmission on-off pattern based on a duration of the second UL communication signal. The communicating the second UL communication signal is further in response to the instruction to override the off-duration of the first UL transmission on-off pattern and a determination that there is no UL transmission within a time period immediately before a start time of the second UL communication signal, the time period being greater than or equal to an off-duration of the first UL transmission on-off pattern. Each CG resource of the plurality of CG resources is within an on-duration of the first UL transmission on-off pattern. Each UL transmission occasion of the plurality of UL transmission occasions is within one or more on-durations of the first UL transmission on-off pattern. The plurality of UL transmission occasions are associated with at least one of a scheduling request (SR), a periodic-channel state information (P-CSI), a semi-persistent-channel state information (SP-CSI), a periodic-sounding reference signal (P-SRS), or a semi-persistent-sounding reference signal (SP-SRS). The first wireless communication device is a user equipment (UE), the method may further include receiving, by the UE from the second wireless communication device, a configuration indicating a transmission period for transmitting a second UL communication signal; and refraining, by the UE, from transmitting the second UL communication signal based on at least a portion of the indicated transmission period being outside of an on-duration of first UL transmission on-off pattern. The first wireless communication device is a user equipment (UE), the method may further include receiving, by the UE from the second wireless communication device, a configuration indicating a start time for transmitting the first UL communication signal, where the communicating the first UL communication signal includes deferring, by the UE, a transmission of the first UL communication signal to an on-duration of the first UL transmission on-off pattern based on the start time being within an off-duration of the first UL transmission on-off pattern. An on-duration of the second UL transmission on-off pattern is aligned to an off-duration of the first UL transmission on-off pattern. The communicating the first UL communication signal includes communicating, by the first wireless communication device with the second wireless communication device, the first UL communication signal in a first frequency subband within the unlicensed band; and the method may further include communicating, by the first wireless communication device with the second wireless communication device, a second UL communication signal in a second frequency subband within the unlicensed band based on a frequency-hopping pattern.

Further aspects of the present disclosure include an apparatus including a transceiver configured to communicate, with a second wireless communication device, a configuration indicating a plurality of uplink (UL) transmission on-off patterns that are offset from each other in time; and communicate, with the second wireless communication device in an unlicensed band, a first UL communication signal based on a first UL transmission on-off pattern of the plurality of UL transmission on-off patterns.

The apparatus may also include one or more of the following features. For instance, the apparatus may include where the configuration indicates at least one of an on-duration, an off-duration, a periodicity, or a time offset for the first UL transmission on-off pattern. The apparatus may further include a processor configured to determine a schedule for the first UL communication signal based on an on-duration of the first UL transmission on-off pattern. The transceiver configured to communicate the configuration is configured to communicate, with the second wireless communication device, the configuration indicating the plurality of UL transmission on-off patterns via radio resource control (RRC) signaling. The transceiver is further configured to communicate, with the second wireless communication device, an instruction to switch to a second UL transmission on-off pattern of the plurality of UL transmission on-off patterns. The transceiver configured to communicate the instruction is further configured to communicate, with the second wireless communication device, the instruction to switch to the second UL transmission on-off pattern via at least one of radio resource control (RRC) signaling, media access control (MAC) control element (CE) signaling, or downlink control information (dci) signaling. The transceiver is further configured to communicate, with the second wireless communication device in response to the instruction, a second UL communication signal based on the second UL transmission on-off pattern. The transceiver configured to communicate the instruction is further configured to communicate, with the second wireless communication device, an UL scheduling grant for the second UL communication signal, the UL scheduling grant including the instruction to switch to the second UL transmission on-off pattern. The transceiver configured to communicate the instruction is further configured to communicate, with the second wireless communication device, a downlink (DL) scheduling grant including the instruction to switch to the second UL transmission on-off pattern; and the transceiver is further configured to communicate, with the second wireless communication device in response to the DL scheduling grant, a downlink (DL) communication signal; and the communicating the second UL communication signal includes communicate, with the second wireless communication device, an acknowledgement/negative-acknowledgement (ACK/NACK) feedback for the DL communication signal. The apparatus is a user equipment (UE), the apparatus may further include a processor configured to switch to the second UL transmission on-off pattern in response to a determination that there is no UL transmission within a time period immediately before a start time of the second UL communication signal, the time period being greater than or equal to an off-duration of the second UL transmission on-off pattern. The apparatus may further include a processor configured to switch from the second UL transmission on-off pattern to the first UL transmission on-off pattern after communicating the second UL communication signal. The transceiver configured to communicate the second UL communication signal is further configured to communicate, with the second wireless communication device, the second UL communication signal during at least two on-durations of the second UL transmission on-off pattern that are spaced apart by an off-duration of the second UL transmission on-off pattern. The apparatus is a base station (BS), the apparatus may further include a processor configured to select the second UL transmission on-off pattern from the plurality of UL transmission on-off patterns based on a start time of the second UL communication signal. The apparatus is a base station (BS), the apparatus may further include a processor configured to configure a timer in response to communicating the instruction to switch to the second UL transmission on-off pattern. The transceiver is further configured to communicate, with the second wireless communication device, a downlink (DL) scheduling grant for a DL communication signal, the scheduling grant indicating an acknowledgement/negative-acknowledgement (ACK/NACK) time offset; and communicate, with the second wireless communication device, the DL communication signal, where the transceiver configured to communicate the first UL communication signal is further configured to communicate, with the second wireless communication device in response to the DL communication signal, an ACK/NACK feedback during an on-duration of the first UL transmission on-off pattern, the first UL communication signal being offset from a start of the on-duration by the ACK/NACK offset. The transceiver is further configured to communicate, with the second wireless communication device, a second UL communication signal during an off-duration of the first UL transmission on-off pattern based on a duration of the second UL communication signal. The transceiver is further configured to communicate, with the second wireless communication device, a configured grant (CG) indicating a plurality of CG resources, where each CG resource of the plurality of CG resources is within an on-duration of the first UL transmission on-off pattern. The transceiver is further configured to communicate, with the second wireless communication device, a UL signaling configuration indicating a plurality of UL transmission occasions, where each UL transmission occasion of the plurality of UL transmission occasions is within one or more on-durations of the first UL transmission on-off pattern. The apparatus is a user equipment (UE), and where the transceiver is further configured to receive, from the second wireless communication device, a configuration indicating a transmission period for transmitting a second UL communication signal; and refrain from transmitting the second UL communication signal based on at least a portion of the indicated transmission period being outside of an on-duration of first UL transmission on-off pattern. The apparatus is a user equipment (UE), and where the transceiver is further configured to receive, from the second wireless communication device, a configuration indicating a start time for transmitting the first UL communication signal, the apparatus may further include a processor configured to defer the transmission of the first UL communication signal to an on-duration of the first UL transmission on-off pattern based on the start time being within an off-duration of the first UL transmission on-off pattern. The transceiver is further configured to communicate, with a third wireless communication device different from the second wireless communication device, a second UL communication signal based on a second UL transmission on-off pattern, where an on-duration of the second UL transmission on-off pattern is aligned to an off-duration of the first UL transmission on-off pattern. The transceiver configured to communicate the first UL communication signal is further configured to communicate, with the second wireless communication device, the first UL communication signal in a first frequency subband within the unlicensed band; and the apparatus may further include a processor configured to communicate, with the second wireless communication device, a second UL communication signal in a second frequency subband within the unlicensed band based on a frequency-hopping pattern.

Further aspects of the present disclosure include a non-transitory computer-readable medium having program code recorded thereon. The non-transitory computer-readable medium includes code for causing a first wireless communication device to communicate, with a second wireless communication device, a configuration indicating a plurality of uplink (UL) transmission on-off patterns that are offset from each other in time. The medium also includes code for causing the first wireless communication device to communicate, with the second wireless communication device in an unlicensed band, a first UL communication signal based on a first UL transmission on-off pattern of the plurality of UL transmission on-off patterns.

The non-transitory computer-readable medium may also include one or more of the following features. For instance, the non-transitory computer-readable medium may include where the configuration indicates at least one of an on-duration, an off-duration, a periodicity, or a time offset for the first UL transmission on-off pattern. The non-transitory computer-readable medium may further include code for causing the first wireless communication device to determine a schedule for the first UL communication signal based on an on-duration of the first UL transmission on-off pattern. Code for causing the first wireless communication device to communicate the configuration is configured to communicate, with the second wireless communication device, the configuration indicating the plurality of UL transmission on-off patterns via radio resource control (RRC) signaling. The non-transitory computer-readable medium may further include code for causing the first wireless communication device to communicate, with the second wireless communication device, an instruction to switch to a second UL transmission on-off pattern of the plurality of UL transmission on-off patterns. Code for causing the first wireless communication device to communicate the instruction is further configured to communicate, with the second wireless communication device, the instruction to switch to the second UL transmission on-off pattern via at least one of radio resource control (RRC) signaling, media access control (MAC) control element (CE) signaling, or downlink control information (dci) signaling. The non-transitory computer-readable medium may further include code for causing the first wireless communication device to communicate, with the second wireless communication device in response to the instruction, a second UL communication signal based on the second UL transmission on-off pattern. The code for causing the first wireless communication device to communicate the instruction is further configured to communicate, with the second wireless communication device, an UL scheduling grant for the second UL communication signal, the UL scheduling grant including the instruction to switch to the second UL transmission on-off pattern. The code for causing the first wireless communication device to communicate the instruction is further configured to communicate, with the second wireless communication device, a downlink (DL) scheduling grant including the instruction to switch to the second UL transmission on-off pattern; and the program code may further include code for causing the first wireless communication device to communicate, with the second wireless communication device in response to the DL scheduling grant, a downlink (DL) communication signal; and the communicating the second UL communication signal includes communicate, with the second wireless communication device, an acknowledgement/negative-acknowledgement (ACK/NACK) feedback for the DL communication signal. The first wireless communication device is a user equipment (UE), the program code may further include code for causing the first wireless communication device to switch to the second UL transmission on-off pattern in response to a determination that there is no UL transmission within a time period immediately before a start time of the second UL communication signal, the time period being greater than or equal to an off-duration of the second UL transmission on-off pattern. The non-transitory computer-readable medium may further include code for causing the first wireless communication device to switch from the second UL transmission on-off pattern to the first UL transmission on-off pattern after communicating the second UL communication signal. The code for causing the first wireless communication device to communicate the second UL communication signal is further configured to communicate, with the second wireless communication device, the second UL communication signal during at least two on-durations of the second UL transmission on-off pattern that are spaced apart by an off-duration of the second UL transmission on-off pattern. The first wireless communication device is a base station (BS), the program code may further include code for causing the first wireless communication device to select the second UL transmission on-off pattern from the plurality of UL transmission on-off patterns based on a start time of the second UL communication signal. The first wireless communication device is a base station (BS), the program code may further include code for causing the first wireless communication device to configure a timer in response to communicating the instruction to switch to the second UL transmission on-off pattern. The non-transitory computer-readable medium may further include code for causing the first wireless communication device to switch from the second UL transmission on-off pattern to the first UL transmission on-off pattern in response to an expiration of the timer. Code for causing the first wireless communication device to communicate the first UL communication signal is further configured to communicate, with the second wireless communication device in response to the DL communication signal, an ACK/NACK feedback during an on-duration of the first UL transmission on-off pattern, the first UL communication signal being offset from a start of the on-duration by the ACK/NACK offset. The non-transitory computer-readable medium may further include code for causing the first wireless communication device to communicate, with the second wireless communication device, a second UL communication signal during an off-duration of the first UL transmission on-off pattern based on a duration of the second UL communication signal. The code for causing the first wireless communication device to communicate the second UL communication signal is further configured to communicate the second UL communication signal further in response to the instruction to override the off-duration of the first UL transmission on-off pattern and a determination that there is no UL transmission within a time period immediately before a start time of the second UL communication signal, the time period being greater than or equal to an off-duration of the first UL transmission on-off pattern. Each CG resource of the plurality of CG resources is within an on-duration of the first UL transmission on-off pattern. Each UL transmission occasion of the plurality of UL transmission occasions is within one or more on-durations of the first UL transmission on-off pattern. The plurality of UL transmission occasions are associated with at least one of a scheduling request (SR), a periodic-channel state information (P-CSI), a semi-persistent-channel state information (SP-CSI), a periodic-sounding reference signal (P-SRS), or a semi-persistent-sounding reference signal (SP-SRS). The first wireless communication device is a user equipment (UE), the program code may further include code for causing the first wireless communication device to receive, from the second wireless communication device, a configuration indicating a transmission period for transmitting a second UL communication signal; and code for causing the first wireless communication device to refrain from transmitting the second UL communication signal based on at least a portion of the indicated transmission period being outside of an on-duration of first UL transmission on-off pattern. The first wireless communication device is a user equipment (UE), the program code may further include code for causing the first wireless communication device to receive, from the second wireless communication device, a configuration indicating a start time for transmitting the first UL communication signal; code for causing the first wireless communication device to defer the transmission of the first UL communication signal to an on-duration of the first UL transmission on-off pattern based on the start time being within an off-duration of the first UL transmission on-off pattern. An on-duration of the second UL transmission on-off pattern is aligned to an off-duration of the first UL transmission on-off pattern. The code for causing the first wireless communication device to communicate the first UL communication signal is further configured to communicate, with the second wireless communication device, the first UL communication signal in a first frequency subband within the unlicensed band; and the program code may further include code for causing the first wireless communication device to communicate, with the second wireless communication device, a second UL communication signal in a second frequency subband within the unlicensed band based on a frequency-hopping pattern.

Further aspects of the present disclosure include an apparatus including means for communicating, with a second wireless communication device, a configuration indicating a plurality of uplink (UL) transmission on-off patterns that are offset from each other in time. The apparatus also includes means for communicating, with the second wireless communication device in an unlicensed band, a first UL communication signal based on a first UL transmission on-off pattern of the plurality of UL transmission on-off patterns.

The apparatus may also include one or more of the following features. For instance, the apparatus may include where the configuration indicates at least one of an on-duration, an off-duration, a periodicity, or a time offset for the first UL transmission on-off pattern. The apparatus may further include means for determining a schedule for the first UL communication signal based on an on-duration of the first UL transmission on-off pattern. Means for communicating the configuration is configured to communicate, with the second wireless communication device, the configuration indicating the plurality of UL transmission on-off patterns via radio resource control (RRC) signaling. The apparatus may further include means for communicating, with the second wireless communication device, an instruction to switch to a second UL transmission on-off pattern of the plurality of UL transmission on-off patterns. Means for communicating the instruction is further configured to communicate, with the second wireless communication device, the instruction to switch to the second UL transmission on-off pattern via at least one of radio resource control (RRC) signaling, media access control (MAC) control element (CE) signaling, or downlink control information (dci) signaling. The apparatus may further include means for communicating, with the second wireless communication device in response to the instruction, a second UL communication signal based on the second UL transmission on-off pattern. Means for communicating the instruction is further configured to communicate, with the second wireless communication device, an UL scheduling grant for the second UL communication signal, the UL scheduling grant including the instruction to switch to the second UL transmission on-off pattern. Colon>means for communicating the instruction is further configured to communicate, with the second wireless communication device, a downlink (DL) scheduling grant including the instruction to switch to the second UL transmission on-off pattern; and the apparatus may further include means for communicating, with the second wireless communication device in response to the DL scheduling grant, a downlink (DL) communication signal; and the means for communicating the second UL communication signal includes communicate, with the second wireless communication device, an acknowledgement/negative-acknowledgement (ACK/NACK) feedback for the DL communication signal. The apparatus is a user equipment (UE), the apparatus may further include means for switching to the second UL transmission on-off pattern in response to a determination that there is no UL transmission within a time period immediately before a start time of the second UL communication signal, the time period being greater than or equal to an off-duration of the second UL transmission on-off pattern. The apparatus may further include means for switching from the second UL transmission on-off pattern to the first UL transmission on-off pattern after communicating the second UL communication signal. The means for communicating the second UL communication signal is further configured to communicate, with the second wireless communication device, the second UL communication signal during at least two on-durations of the second UL transmission on-off pattern that are spaced apart by an off-duration of the second UL transmission on-off pattern. The apparatus is a base station (BS), the apparatus may further include means for selecting the second UL transmission on-off pattern from the plurality of UL transmission on-off patterns based on a start time of the second UL communication signal. The apparatus is a base station (BS), the apparatus may further include means for configuring a timer in response to communicating the instruction to switch to the second UL transmission on-off pattern. The means for communicating the first UL communication signal is further configured to communicate, with the second wireless communication device in response to the DL communication signal, an ACK/NACK feedback during an on-duration of the first UL transmission on-off pattern, the first UL communication signal being offset from a start of the on-duration by the ACK/NACK offset. The apparatus may further include means for communicating, with the second wireless communication device, a second UL communication signal during an off-duration of the first UL transmission on-off pattern based on a duration of the second UL communication signal. Each CG resource of the plurality of CG resources is within an on-duration of the first UL transmission on-off pattern. Each UL transmission occasion of the plurality of UL transmission occasions is within one or more on-durations of the first UL transmission on-off pattern. The apparatus is a user equipment (UE), the apparatus may further include means for receiving, from the second wireless communication device, a configuration indicating a transmission period for transmitting a second UL communication signal; and means for refraining from transmitting the second UL communication signal based on at least a portion of the indicated transmission period being outside of an on-duration of first UL transmission on-off pattern. The apparatus is a user equipment (UE), the apparatus may further include means for receiving, from the second wireless communication device, a configuration indicating a start time for transmitting the first UL communication signal; means for deferring the transmission of the first UL communication signal to an on-duration of the first UL transmission on-off pattern based on the start time being within an off-duration of the first UL transmission on-off pattern. An on-duration of the second UL transmission on-off pattern is aligned to an off-duration of the first UL transmission on-off pattern. The means for communicating the first UL communication signal is further configured to communicate, with the second wireless communication device, the first UL communication signal in a first frequency subband within the unlicensed band; and the apparatus may further include means for communicating, with the second wireless communication device, a second UL communication signal in a second frequency subband within the unlicensed band based on a frequency-hopping pattern.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   communicating, by a first wireless communication device with a second wireless communication device, a configuration indicating a plurality of uplink (UL) transmission on-off patterns that are offset from each other in time; and
   communicating, by the first wireless communication device with the second wireless communication device in an unlicensed band, a first UL communication signal based on a first UL transmission on-off pattern of the plurality of UL transmission on-off patterns.

2. The method of claim 1, wherein the configuration indicates at least one of an on-duration, an off-duration, a periodicity, or a time offset for the first UL transmission on-off pattern.

3. The method of claim 1, further comprising:
   determining, by the first wireless communication device, a schedule for the first UL communication signal based on an on-duration of the first UL transmission on-off pattern.

4. The method of claim 1, further comprising:
   communicating, by the first wireless communication device with the second wireless communication device, an instruction to switch to a second UL transmission on-off pattern of the plurality of UL transmission on-off patterns; and
   communicating, by the first wireless communication device with the second wireless communication device in response to the instruction, a second UL communication signal based on the second UL transmission on-off pattern.

5. The method of claim 4, wherein the communicating the instruction comprises:
   communicating, by the first wireless communication device with the second wireless communication device, an UL scheduling grant for the second UL communication signal, the UL scheduling grant comprising the instruction to switch to the second UL transmission on-off pattern.

6. The method of claim 4, wherein:
the communicating the instruction comprises:
communicating, by the first wireless communication device with the second wireless communication device, a downlink (DL) scheduling grant comprising the instruction to switch to the second UL transmission on-off pattern;
the method further comprises:
communicating, by the first wireless communication device with the second wireless communication device in response to the DL scheduling grant, a downlink (DL) communication signal; and
the communicating the second UL communication signal comprises:
communicating, by the first wireless communication device with the second wireless communication device, an acknowledgement/negative-acknowledgement (ACK/NACK) feedback for the DL communication signal.

7. The method of claim 4, wherein the first wireless communication device is a user equipment (UE), the method further comprising:
switching, by the first wireless communication device, to the second UL transmission on-off pattern in response to a determination that there is no UL transmission within a time period immediately before a start time of the second UL communication signal, the time period being greater than or equal to an off-duration of the second UL transmission on-off pattern.

8. The method of claim 4, further comprising:
switching, by the first wireless communication device, from the second UL transmission on-off pattern to the first UL transmission on-off pattern after communicating the second UL communication signal.

9. The method of claim 4, wherein the communicating the second UL communication signal comprises:
communicating, by the first wireless communication device with the second wireless communication device, the second UL communication signal during at least two on-durations of the second UL transmission on-off pattern that are spaced apart by an off-duration of the second UL transmission on-off pattern.

10. The method of claim 4, wherein the first wireless communication device is a base station (BS), the method further comprising:
selecting, by the first wireless communication device, the second UL transmission on-off pattern from the plurality of UL transmission on-off patterns based on a start time of the second UL communication signal.

11. The method of claim 1, wherein the first wireless communication device is a base station (BS), the method further comprising:
communicating, by the BS with the second wireless communication device, an instruction to switch to a second UL transmission on-off pattern of the plurality of UL transmission on-off patterns;
configuring, by the BS, a timer in response to communicating the instruction to switch to the second UL transmission on-off pattern; and
switching, by the BS, from the second UL transmission on-off pattern to the first UL transmission on-off pattern in response to an expiration of the timer.

12. The method of claim 1, further comprising:
communicating, by the first wireless communication device with the second wireless communication device, a downlink (DL) scheduling grant for a DL communication signal, the scheduling grant indicating an acknowledgement/negative-acknowledgement (ACK/NACK) time offset; and
communicating, by the first wireless communication device with the second wireless communication device, the DL communication signal,
wherein the communicating the first UL communication signal comprises:
communicating, by the first wireless communication device with the second wireless communication device in response to the DL communication signal, an ACK/NACK feedback during an on-duration of the first UL transmission on-off pattern, the first UL communication signal being offset from a start of the on-duration by the ACK/NACK offset.

13. The method of claim 1, further comprising:
communicating, by the first wireless communication device with the second wireless communication device, a second UL communication signal during an off-duration of the first UL transmission on-off pattern based on a duration of the second UL communication signal.

14. The method of claim 13, further comprising:
communicating, by the first wireless communication device with the second wireless communication device, an instruction to override the off-duration of the first UL transmission on-off pattern,
wherein the communicating the second UL communication signal is further in response to the instruction to override the off-duration of the first UL transmission on-off pattern and a determination that there is no UL transmission within a time period immediately before a start time of the second UL communication signal, the time period being greater than or equal to the off-duration of the first UL transmission on-off pattern.

15. The method of claim 1, further comprising:
communicating, by the first wireless communication device with the second wireless communication device, a configured grant (CG) indicating a plurality of CG resources, wherein each CG resource of the plurality of CG resources is within an on-duration of the first UL transmission on-off pattern.

16. The method of claim 1, further comprising:
communicating, by the first wireless communication device with the second wireless communication device, a UL signaling configuration indicating a plurality of UL transmission occasions, wherein each UL transmission occasion of the plurality of UL transmission occasions is within one or more on-durations of the first UL transmission on-off pattern,
wherein the plurality of UL transmission occasions are associated with at least one of a scheduling request (SR), a periodic-channel state information (P-CSI), a semi-persistent-channel state information (SP-CSI), a periodic-sounding reference signal (P-SRS), or a semi-persistent-sounding reference signal (SP-SRS).

17. The method of claim 1, wherein the first wireless communication device is a user equipment (UE), the method further comprising:
receiving, by the UE from the second wireless communication device, a configuration indicating a transmission period for transmitting a second UL communication signal; and
refraining, by the UE, from transmitting the second UL communication signal based on at least a portion of the indicated transmission period being outside of an on-duration of first UL transmission on-off pattern.

18. The method of claim 1, wherein the first wireless communication device is a user equipment (UE), the method further comprising:
receiving, by the UE from the second wireless communication device, a configuration indicating a start time for transmitting the first UL communication signal,
wherein the communicating the first UL communication signal comprises:
deferring, by the UE, a transmission of the first UL communication signal to an on-duration of the first UL transmission on-off pattern based on the start time being within an off-duration of the first UL transmission on-off pattern.

19. The method of claim 1, further comprising:
communicating, by the first wireless communication device with a third wireless communication device different from the second wireless communication device, a second UL communication signal based on a second UL transmission on-off pattern, wherein an on-duration of the second UL transmission on-off pattern is aligned to an off-duration of the first UL transmission on-off pattern.

20. The method of claim 1, wherein:
the communicating the first UL communication signal comprises:
communicating, by the first wireless communication device with the second wireless communication device, the first UL communication signal in a first frequency subband within the unlicensed band; and
the method further comprising:
communicating, by the first wireless communication device with the second wireless communication device, a second UL communication signal in a second frequency subband within the unlicensed band based on a frequency-hopping pattern.

21. An apparatus comprising:
a processor; and
a transceiver coupled to the processor, wherein the transceiver is configured to:
communicate, with a second wireless communication device, a configuration indicating a plurality of uplink (UL) transmission on-off patterns that are offset from each other in time; and
communicate, with the second wireless communication device in an unlicensed band, a first UL communication signal based on a first UL transmission on-off pattern of the plurality of UL transmission on-off patterns.

22. The apparatus of claim 21, wherein the configuration indicates at least one of an on-duration, an off-duration, a periodicity, or a time offset for the first UL transmission on-off pattern.

23. The apparatus of claim 21, wherein the processor is further configured to:
determine a schedule for the first UL communication signal based on an on-duration of the first UL transmission on-off pattern.

24. The apparatus of claim 21, wherein the transceiver is further configured to:
communicate, with the second wireless communication device, an instruction to switch to a second UL transmission on-off pattern of the plurality of UL transmission on-off patterns; and
communicate, with the second wireless communication device in response to the instruction, a second UL communication signal based on the second UL transmission on-off pattern.

25. The apparatus of claim 21, wherein:
the apparatus is a base station (BS);
the transceiver is further configured to:
communicate, with the second wireless communication device, an instruction to switch to a second UL transmission on-off pattern of the plurality of UL transmission on-off patterns; and
the apparatus further comprises:
a processor configured to configure a timer in response to communicating the instruction to switch to the second UL transmission on-off pattern; and
switch from the second UL transmission on-off pattern to the first UL transmission on-off pattern in response to an expiration of the timer.

26. The apparatus of claim 21, wherein the transceiver is further configured to:
communicate, with a third wireless communication device different from the second wireless communication device, a second UL communication signal based on a second UL transmission on-off pattern, wherein an on-duration of the second UL transmission on-off pattern is aligned to an off-duration of the first UL transmission on-off pattern.

27. A non-transitory computer-readable medium having program code recorded thereon, the program code comprising:
code for causing a first wireless communication device to communicate, with a second wireless communication device, a configuration indicating a plurality of uplink (UL) transmission on-off patterns that are offset from each other in time; and
code for causing the first wireless communication device to communicate, with the second wireless communication device in an unlicensed band, a first UL communication signal based on a first UL transmission on-off pattern of the plurality of UL transmission on-off patterns.

28. The non-transitory computer-readable medium of claim 27, further comprising:
code for causing the first wireless communication device to communicate, with the second wireless communication device, an instruction to switch to a second UL transmission on-off pattern of the plurality of UL transmission on-off patterns; and
code for causing the first wireless communication device to communicate, with the second wireless communication device in response to the instruction, a second UL communication signal based on the second UL transmission on-off pattern.

29. An apparatus comprising:
means for communicating, with a second wireless communication device, a configuration indicating a plurality of uplink (UL) transmission on-off patterns that are offset from each other in time; and
means for communicating, with the second wireless communication device in an unlicensed band, a first UL communication signal based on a first UL transmission on-off pattern of the plurality of UL transmission on-off patterns.

30. The apparatus of claim 29, further comprising:
means for communicating, with the second wireless communication device, an instruction to switch to a second UL transmission on-off pattern of the plurality of UL transmission on-off patterns; and
means for communicating, with the second wireless communication device in response to the instruction, a second UL communication signal based on the second UL transmission on-off pattern.

* * * * *